United States Patent
Matsumoto et al.

(10) Patent No.: US 7,580,785 B2
(45) Date of Patent: Aug. 25, 2009

(54) VEHICLE DYNAMICS CONTROL APPARATUS

(75) Inventors: Shinji Matsumoto, Kanagawa (JP); Genpei Naito, Yokohama (JP); Satoshi Tange, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/111,710

(22) Filed: Apr. 29, 2008

(65) Prior Publication Data

US 2008/0208409 A1 Aug. 28, 2008

Related U.S. Application Data

(62) Division of application No. 10/769,069, filed on Feb. 2, 2004, now Pat. No. 7,392,120.

(30) Foreign Application Priority Data

Feb. 10, 2003 (JP) .............................. 2003-032459

(51) Int. Cl.
*B60K 31/00* (2006.01)
(52) U.S. Cl. .......................... 701/70; 701/301; 701/41; 701/26; 701/83; 342/70; 342/71; 303/125; 303/132; 303/167
(58) Field of Classification Search .................. 701/47, 701/70, 93, 301; 303/167, 132, 125; 342/70–71; 180/168–170
See application file for complete search history.

(56) References Cited

U.S. PATENT DOCUMENTS 4,727,492 A 2/1988 Reeve et al.

5,483,453 A * 1/1996 Uemura et al. ................ 701/23

(Continued)

FOREIGN PATENT DOCUMENTS

CN 1464999 A * 12/2003

(Continued)

OTHER PUBLICATIONS

Predictive Active Steering Control for Autonomous Vehicle Systems, Falcone, P.; Borrelli, F.; Asgari, J.; Tseng, H. E.; Hrovat, D.; Control Systems Technology, IEEE Transactions on, vol. 15, Issue 3, May 2007 pp. 566-580, Digital Object Identifier 10.1109/TCST.2007.894653.*

(Continued)

*Primary Examiner*—Cuong H Nguyen
(74) *Attorney, Agent, or Firm*—Foley & Lardner LLP

(57) ABSTRACT

In a vehicle dynamics control apparatus capable of balancing a vehicle dynamics stability control system and a lane deviation prevention control system, a cooperative control section is provided to make a cooperative control between lane deviation prevention control (LDP) and vehicle dynamics stability control (VDC). When a direction of yawing motion created by LDP control is opposite to a direction of yawing motion created by VDC control, the cooperative control section puts a higher priority on VDC control rather than LDP control. Conversely when the direction of yawing motion created by LDP control is identical to the direction of yawing motion created by VDC control, a higher one of the LDP desired yaw moment and the VDC desired yaw moment is selected as a final desired yaw moment, to prevent over-control, while keeping the effects obtained by both of VDC control and LDP control.

17 Claims, 11 Drawing Sheets

U.S. PATENT DOCUMENTS

| | | | |
|---|---|---|---|
| 5,508,929 A * | 4/1996 | Harada | 701/48 |
| 5,615,117 A * | 3/1997 | Serizawa | 701/42 |
| 5,762,406 A * | 6/1998 | Yasui et al. | 303/146 |
| 6,014,595 A * | 1/2000 | Kobayashi | 701/1 |
| 6,021,367 A * | 2/2000 | Pilutti et al. | 701/41 |
| 6,057,754 A * | 5/2000 | Kinoshita et al. | 340/435 |
| 6,059,067 A * | 5/2000 | Shibahata et al. | 180/338 |
| 6,089,680 A * | 7/2000 | Yoshioka et al. | 303/146 |
| 6,216,079 B1 * | 4/2001 | Matsuda | 701/70 |
| 6,256,561 B1 * | 7/2001 | Asanuma | 701/41 |
| 6,334,656 B1 * | 1/2002 | Furukawa et al. | 303/146 |
| 6,338,012 B2 * | 1/2002 | Brown et al. | 701/1 |
| 6,370,474 B1 * | 4/2002 | Hiwatashi et al. | 701/300 |
| 6,409,287 B1 * | 6/2002 | Leach et al. | 303/146 |
| 6,411,901 B1 * | 6/2002 | Hiwatashi et al. | 701/301 |
| 6,442,469 B1 * | 8/2002 | Matsuno | 701/70 |
| 6,449,542 B1 * | 9/2002 | Bottiger et al. | 701/41 |
| 6,453,228 B1 * | 9/2002 | Shimada | 701/89 |
| 6,469,664 B1 * | 10/2002 | Michaelson et al. | 342/357.13 |
| 6,487,501 B1 * | 11/2002 | Jeon | 701/301 |
| 6,489,887 B2 * | 12/2002 | Satoh et al. | 340/436 |
| 6,549,840 B1 * | 4/2003 | Mikami et al. | 701/69 |
| 6,685,279 B2 * | 2/2004 | Koyama | 303/116.1 |
| 6,702,717 B2 * | 3/2004 | Murakami | 477/182 |
| 7,392,120 B2 * | 6/2008 | Matsumoto et al. | 701/41 |
| 2001/0008986 A1 | 7/2001 | Brown et al. | |
| 2002/0013647 A1 | 1/2002 | Kawazoe et al. | |
| 2002/0032512 A1 | 3/2002 | Shimada | |
| 2002/0032521 A1 | 3/2002 | Machii et al. | |
| 2002/0194037 A1 | 12/2002 | Creed et al. | |
| 2003/0014162 A1 | 1/2003 | Sadano | |
| 2003/0132665 A1 | 7/2003 | Koyama | |
| 2003/0156049 A1 | 8/2003 | Behr et al. | |
| 2004/0158377 A1 | 8/2004 | Matsumoto et al. | |
| 2004/0215393 A1 | 10/2004 | Matsumoto et al. | |
| 2004/0267427 A1 | 12/2004 | Suzuki et al. | |

FOREIGN PATENT DOCUMENTS

| | | | |
|---|---|---|---|
| CN | 1522910 | | 8/2004 |
| CN | 1522910 A * | | 8/2004 |
| DE | 10 2004 006 540 A1 | | 8/2004 |
| DE | 102004006540 A1 * | | 8/2004 |
| DE | 196 47 438 | | 10/2006 |
| EP | 0 246 102 B1 | | 9/1993 |
| EP | 0 292 864 B1 | | 10/1994 |
| EP | 1 075 992 A2 | | 2/2001 |
| EP | 1 197 410 A2 | | 4/2002 |
| EP | 1430371 A1 * | | 6/2004 |
| JP | 03-006364 A | | 1/1991 |
| JP | 2000-33860 A | | 2/2000 |
| JP | 2000-272490 | | 10/2000 |
| JP | 2001-71879 A | | 3/2001 |
| JP | 2001-114081 A | | 4/2001 |
| JP | 2004-243787 A | | 9/2004 |
| JP | 2004243787 A * | | 9/2004 |
| JP | 3870911 B2 * | | 1/2007 |
| JP | 2007-038764 A | | 2/2007 |
| KR | 571941 B1 * | | 4/2006 |

OTHER PUBLICATIONS

LTV controller design for vehicle lateral control under fault in rear sensors, Jihua Huang; M. Tomizuka; Mechatronics, IEEE/ASME Transactions on, vol. 10, Issue 1, Feb. 2005 pp. 1-7, Digital Object Identifier 10.1109/TMECH.2004.83904410.1109.*

The development of vehicle stability control at Ford, Tseng, H.E.; Ashrafi, B.; Madau, D.; Allen Brown, T.; Recker, D.; Mechatronics, IEEE/ASME Transactions on, vol. 4, Issue 3, Sep. 1999 pp. 223-234, Digital Object Identifier 10.1109/3516.789681.*

A model predictive control approach for combined braking and steering in autonomous vehicles, Falcone, Paolo; Borrelli, Francesco; Asgari, Jahan; Tseng, H. Eric; Hrovat, Davor; Control & Automation, 2007. MED '07. Mediterranean Conference on Jun. 27-29, 2007 pp. 1-6, Digital Object Identifier 10.1109/MED.2007.4433694.*

P. Falcone et al., "Predictive Active Steering Control for Autonomous Vehicle Systems", Control Systems Technology, IEEE Transactions, vol. 15, Issue 3, May 2007, pp. 566-580.

J. Huang et al., "LTV Controller Design for Vehicle Lateral Control Under Fault in Rear Sensors", Mechatronics, IEEE/ASME Transactions, vol. 10, Issue 1, Feb. 2005, pp. 1-7.

H.E. Tseng et al., "The Development of Vehicle Stability Control at Ford", Mechatronics, IEEE/ASME Transactions, vol. 4, Issue 3, Sep. 1999, pp. 223-234.

P. Falcone et al., "A Model Predictive Control Approach for Combined Braking and Steering in Autonomous Vehicles", Control & Automation, 2007, MED 07, Mediterranean Conference on Jun. 27-29, 2007, pp. 1-6.

* cited by examiner

- - -▶ LDP CONTROL
⎯▶ VDC CONTROL

FIG.13A
FIG.13B
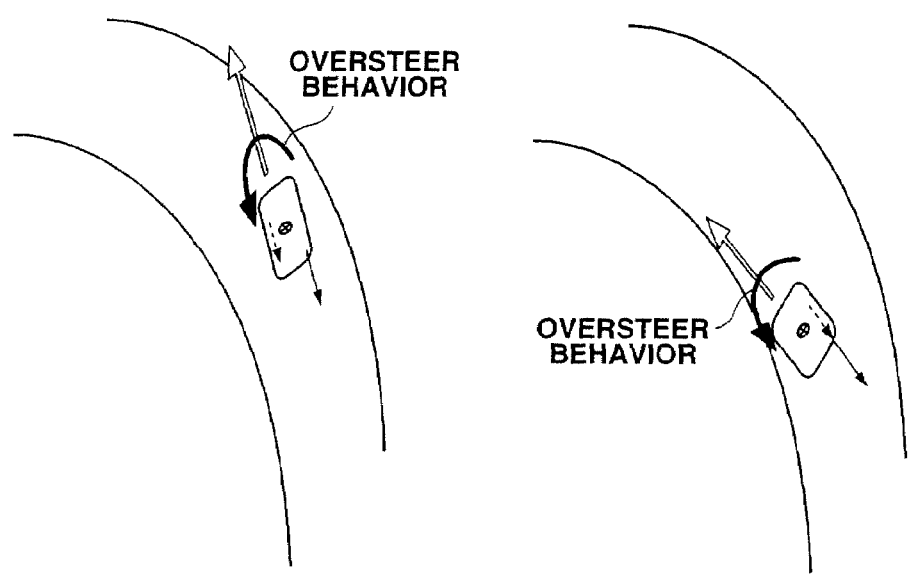
FIG.13C
FIG.13D
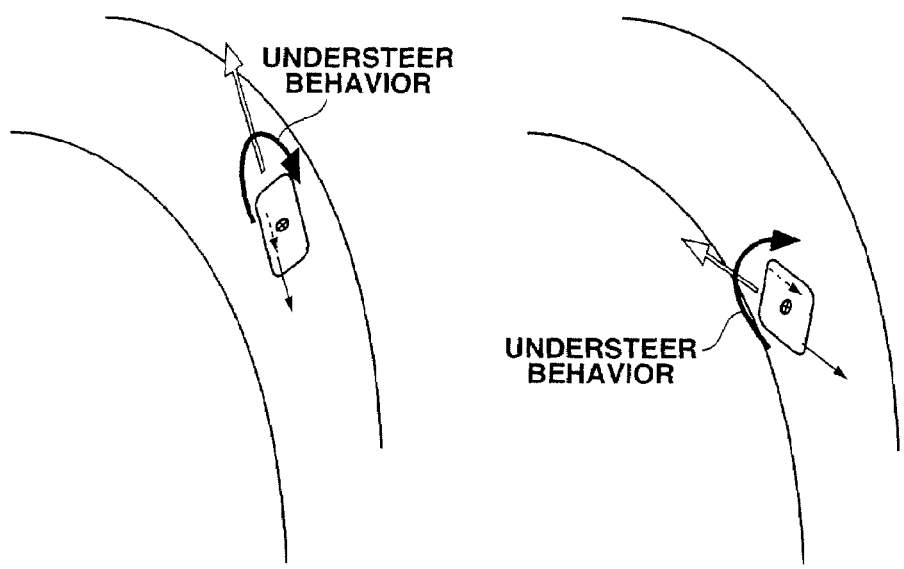
---> LDP CONTROL
⟶ VDC CONTROL

US 7,580,785 B2

VEHICLE DYNAMICS CONTROL APPARATUS

CROSS-REFERENCE TO RELATED APPLICATIONS

The present application is a Divisional of U.S. application Ser. No. 10/769,069, filed Feb. 2, 2004 now U.S. Pat. No. 7,392,120, which is based upon and claims the benefit of priority from prior Japanese Patent Application No. 2003-032459, filed Feb. 10, 2003, the entire contents of which are incorporated herein by reference.

TECHNICAL FIELD

The present invention relates to a vehicle dynamics control apparatus (an integrated vehicle yawing moment control apparatus) for an automotive vehicle having a vehicle dynamics stability control (VDC) function engaged to control dynamic behavior of the vehicle when the driving stability (vehicle driveability and stability is deteriorated and a lane deviation prevention (LDP) function engaged to prevent the vehicle (the host vehicle) from deviating from the driving lane by correcting the host vehicle's course in a direction that the lane deviation is avoided when there is a possibility of the host vehicle's lane deviation.

BACKGROUND ART

On automotive vehicles having both the vehicle dynamics stability control (VDC) function and lane deviation prevention (LDP) function, generally, there are two types of lane deviation prevention control, namely, an LDP control system using a steering actuator and an LDP control system using a braking force actuator. In the steering-actuator based LDP control system, lane deviation is prevented by producing a yaw moment by controlling the steering actuator depending on a host vehicle's lateral displacement or a host vehicle's lateral deviation from a central axis (a reference axis) of the current host vehicle's driving lane. On the other hand, in the braking-force-actuator based LDP control system, lane deviation is prevented by producing a yaw moment by controlling the braking force actuator, such as an ABS-system hydraulic modulator, depending on a host vehicle's lateral deviation from a central axis (a reference axis) of the current host vehicle's driving lane. Usually, in order to produce the yaw moment for lane deviation prevention, braking forces are applied to the road wheels opposite to the direction that the lane deviation occurs. One such braking-force-actuator based LDP control system has been disclosed in Japanese Patent Provisional Publication No. 2000-33860.

Japanese Patent Provisional Publication No. 2001-114081 (hereinafter is referred to as JP2001-114081) discloses a vehicle stability control apparatus that executes vehicle stability control (VSC) by exerting a controlled yaw moment on a host vehicle by way of a left-and-right wheel braking force difference when an electronic control unit determines, based on at least a yaw rate, that the vehicle stability is deteriorated. On the other hand, Japanese Patent Provisional Publication No. 2000-272490 (hereinafter is referred to as JP2000-272490) discloses a vehicle stability control apparatus that executes vehicle stability control (VSC) by exerting a controlled yaw moment on a host vehicle by way of a left-and-right wheel braking force difference when an electronic control unit determines, based on at least a sideslip angle, that the vehicle stability is deteriorated. In the vehicle stability control apparatus disclosed in JP2001-114081 and JP2000-272490, vehicle deceleration control is further combined with the vehicle stability control (VSC), for active collision avoidance or active lane deviation prevention.

SUMMARY OF THE INVENTION

In case of automotive vehicle dynamics control apparatus as disclosed in JP2000-33860, JP2001-114081, or JP2000-272490, enabling lane deviation prevention control and vehicle dynamics stability control (VDC) (or vehicle stability control (VSC)), the LDP control system controls a yaw moment that is a controlled variable for LDP control. On the other hand, in the VDC control system, in the presence of a remarkable deterioration in driving stability, vehicle dynamic behavior, such as a yaw rate and a sideslip angle, is controlled by producing a yaw moment in a direction that the driving stability is enhanced, so that a turning level of the vehicle is reduced to achieve a transition from an unstable driving state (a poor driving stability) approximate to the vehicle's limit drivability to a stable driving state (a good driving stability). In the same manner as the LDP control, the yaw moment is a controlled variable for VDC control (or VSC control). Assuming that LDP control and VDC control are executed independently of each other, there are the following drawbacks.

(1) When the sign of a controlled variable of VDC control is different from that of LDP control, there is an increased tendency for a final controlled variable or a final controlled yaw moment to be undesirably reduced owing to undesirable interference between VDC control and LDP control.

(2) Conversely when the sign of a controlled variable of VDC control is identical to that of LDP control, there is a possibility of an excessive controlled variable, that is, an excessive yaw moment.

Concretely, as can be seen from a control-action explanatory view shown in FIG. 13A, when the host vehicle has an oversteer tendency during cornering and thus the VDC control system comes into operation and additionally the LDP control system determines that the host vehicle tends to deviate from the current driving lane toward the adjacent outside lane, the LDP control system operates to produce a yaw moment in an inward turning direction (see the arrow indicated by the phantom line and acting counterclockwise with respect to the center of gravity of the vehicle in FIG. 13A). On the other hand, the VDC control system operates to produce a yaw moment in an oversteer-avoidance direction (see the arrow indicated by the solid line and acting clockwise with respect to the center of gravity of the vehicle in FIG. 13A). That is, the sense of the controlled variable (the controlled yaw moment) of LDP control indicated by the phantom line is different from that of VDC control indicated by the solid line, and therefore a final controlled variable tends to be undesirably reduced owing to the control interference.

As can be seen from a control-action explanatory view shown in FIG. 13B, when the host vehicle has an oversteer tendency during cornering and thus the VDC control system comes into operation and additionally the LDP control system determines that the host vehicle tends to deviate from the current driving lane toward the adjacent inside lane, the LDP control system operates to produce a yaw moment in an outward turning direction (see the arrow indicated by the phantom line and acting clockwise with respect to the center of gravity of the vehicle in FIG. 13B). On the other hand, the VDC control system operates to produce a yaw moment in an oversteer-avoidance direction (see the arrow indicated by the solid line and acting clockwise with respect to the center of gravity of the vehicle in FIG. 13B). That is, the sense of the controlled variable (the controlled yaw moment) of LDP control indicated by the phantom line is identical to that of VDC control indicated by the solid line, and therefore a final controlled variable tends to be excessively increased.

As can be seen from a control-action explanatory view shown in FIG. 13C, when the host vehicle has an understeer tendency during cornering and thus the VDC control system comes into operation and additionally the LDP control system determines that the host vehicle tends to deviate from the current driving lane toward the adjacent outside lane, the LDP control system operates to produce a yaw moment in an inward turning direction (see the arrow indicated by the phantom line and acting counterclockwise with respect to the center of gravity of the vehicle in FIG. 13C). On the other hand, the VDC control system operates to produce a yaw moment in an understeer-avoidance direction (see the arrow indicated by the solid line and acting counterclockwise with respect to the center of gravity of the vehicle in FIG. 13C). That is, the sense of the controlled variable (the controlled yaw moment) of LDP control indicated by the phantom line is identical to that of VDC control indicated by the solid line, and therefore a final controlled variable tends to be excessively increased.

As can be seen from a control-action explanatory view shown in FIG. 13D, when the host vehicle has an understeer tendency during cornering and thus the VDC control system comes into operation and additionally the LDP control system determines that the host vehicle tends to deviate from the current driving lane toward the adjacent inside lane, the LDP control system operates to produce a yaw moment in an outward turning direction (see the arrow indicated by the phantom line and acting clockwise with respect to the center of gravity of the vehicle in FIG. 13D). On the other hand, the VDC control system operates to produce a yaw moment in an understeer-avoidance direction (see the arrow indicated by the solid line and acting counterclockwise with respect to the center of gravity of the vehicle in FIG. 13D). That is, the sense of the controlled variable (the controlled yaw moment) of the LDP control indicated by the phantom line is different from that of the VDC control indicated by the solid line, and therefore a final controlled variable tends to be undesirably reduced owing to the control interference.

One way to avoid the previously-discussed drawbacks is to execute only the VDC control (only the VSC control) so that a higher priority is put on the VDC control rather than the LDP control. The VDC control system contributes to an enhanced driving stability, for example, suppression of understeer or oversteer. However, such a VDC control system does not operate to avoid the host vehicle's lane deviation from the driving lane. JP2000-272490 teaches the provision of vehicle deceleration control combined with VDC control in order to prevent the host vehicle from deviating from the driving lane during VDC control. Such a deceleration control combined with VDC control is effective to reduce or suppress the degree of the host vehicle's lane deviation from the driving lane. However, as describe previously, there are four basic lane-deviation patterns during VDC control (see FIGS. 13A-13D). For instance, when vehicle deceleration control is initiated in presence of the host vehicle's lane deviation from the current driving lane toward the adjacent inside lane during VDC control, the host vehicle often tends to further rotate about the z-axis in the inward turning direction, owing to a host vehicle's speed drop arising from vehicle deceleration control. Generally, LDP control is superior to vehicle deceleration control in more effective lane deviation prevention.

Therefore, it would be desirable to adequately take into account a mutual balance or control interference between vehicle dynamics stability control (VDC control) and lane deviation prevention control (LDP control), and thus to perform cooperative control between VDC control and LDP control.

Accordingly, it is an object of the invention to provide a vehicle dynamics control apparatus (an integrated yawing motion control apparatus) for an automotive vehicle having a VDC function and an LDP function, which is capable of executing cooperative control between VDC control and LDP control.

In order to accomplish the aforementioned and other objects of the present invention, a vehicle dynamics control apparatus comprises a lane deviation prevention control section that generates a yaw moment in a direction in which lane deviation is avoided, when a host vehicle tends to deviated from a driving lane, a vehicle dynamics control section that generates a yaw moment in a direction in which a driving stability is enhanced, when the driving stability of the host vehicle tends to be lowered, and a cooperative control section that making a cooperative control between lane deviation prevention control achieved by the lane deviation prevention control section and vehicle dynamics stability control achieved by the vehicle dynamics control section.

According to another aspect of the invention, a vehicle dynamics control apparatus comprises lane deviation prevention control means for generating a yaw moment in a direction in which lane deviation is avoided, when a host vehicle tends to deviated from a driving lane, vehicle dynamics control means for generating a yaw moment in a direction in which a driving stability is enhanced, when the driving stability of the host vehicle tends to be lowered, and cooperative control means for making a cooperative control between lane deviation prevention control achieved by the lane deviation prevention control means and vehicle dynamics stability control achieved by the vehicle dynamics control means.

According to a still further aspect of the invention, a method of balancing a vehicle dynamics stability control system and a lane deviation prevention control system, the method comprises making a cooperative control between lane deviation prevention control achieved by the lane deviation prevention control system and vehicle dynamics stability control achieved by the vehicle dynamics stability control system.

The other objects and features of this invention will become understood from the following description with reference to the accompanying drawings.

BRIEF DESCRIPTION OF THE DRAWINGS

FIGS. 13A-13D are comparative explanation drawings showing control actions performed with no cooperative control between LDP control and VDC control, under four different vehicle dynamic behaviors.

DESCRIPTION OF THE PREFERRED EMBODIMENTS

Figure 1:
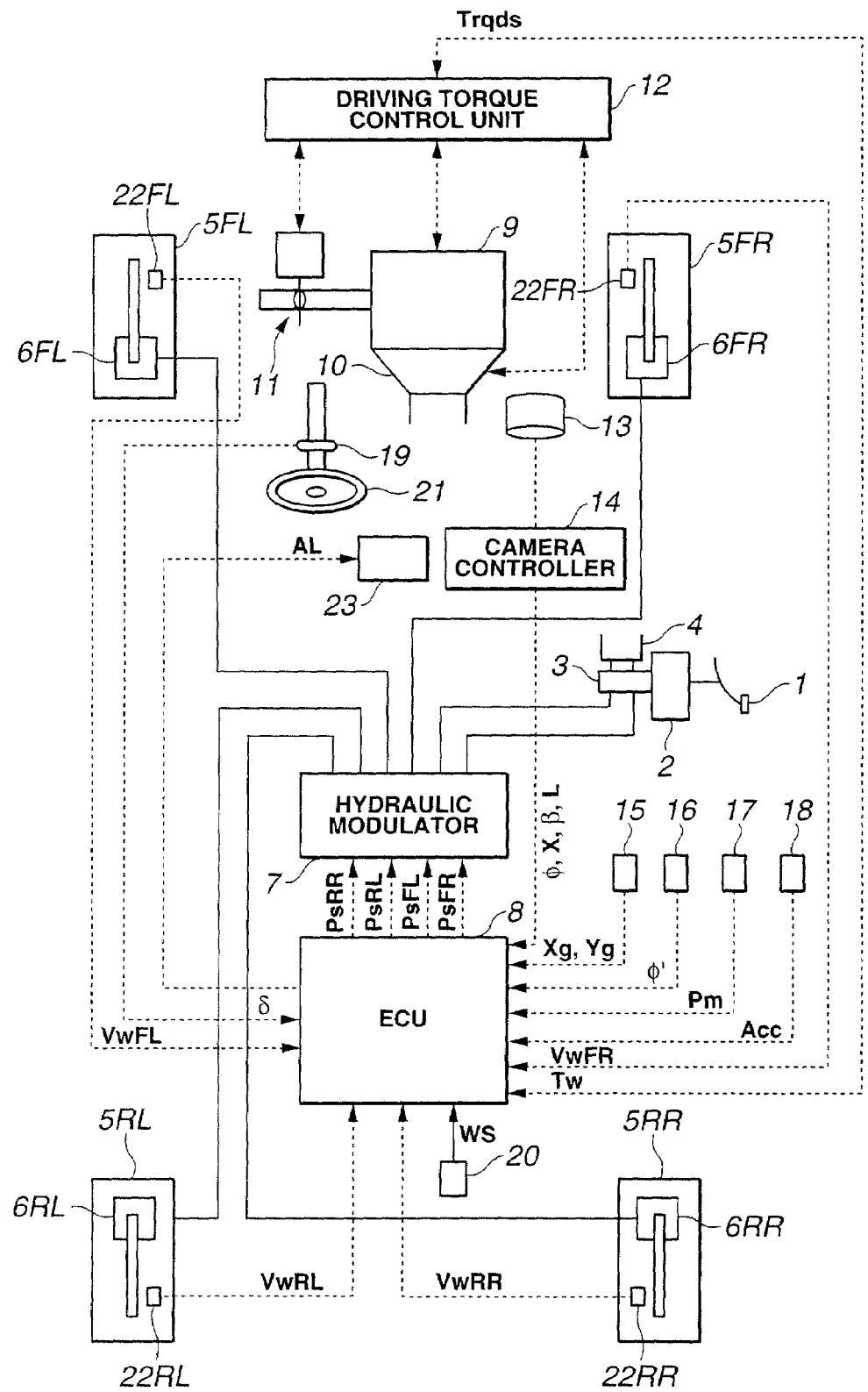
FIG. 1 is a system block diagram showing an embodiment of a vehicle dynamics control apparatus enabling a VDC function and an LDP function.

Referring now to the drawings, particularly to FIG. 1, the vehicle dynamics control apparatus of the embodiment is exemplified in an automotive VDC system equipped rear-wheel-drive vehicle employing an automatic transmission 10 and a rear differential. In the system of the embodiment shown in FIG. 1, as a braking force control system, which regulates hydraulic brake pressures of individual wheel-brake cylinders (i.e., front-left, front-right, rear-left, and rear-right wheel-brake cylinders) independently of each other, a four-channel braking control system such as a four-channel ABS system for anti-skid control or a four-channel traction control system for traction control is utilized. In FIG. 1, reference sign 1 denotes a brake pedal, reference sign 2 denotes a brake booster, reference sign 3 denotes a master cylinder (exactly, a tandem master cylinder used for a dual brake system split into two sections, namely front and rear hydraulic brake sections), and reference sign 4 denotes a brake fluid reservoir. Usually, a brake fluid pressure, risen by master cylinder 3 depending on the amount of depression of brake pedal 1, is supplied to each of a front-left wheel-brake cylinder 6FL for a front-left road wheel 5FL, a front-right wheel-brake cylinder 6FR for a front-right road wheel 5FR, a rear-left wheel-brake cylinder 6RL for a rear-left road wheel 5RL, and a rear-right wheel-brake cylinder 6RR for a rear-right road wheel 5RR. Front-left, front-right, rear-left, and rear-right wheel-brake cylinder pressures are regulated independently of each other by means of a brake fluid pressure control circuit (a wheel cylinder pressure control unit) or a hydraulic modulator 7, which is disposed between master cylinder 3 and each of wheel-brake cylinders 6FL, 6FR, 6RL, and 6RR. Hydraulic modulator 7 includes hydraulic pressure control actuators respectively associated with first-channel (front-left), second-channel (front-right), third-channel (rear-left), and fourth-channel (rear-right) brake circuits, such that front-left, front-right, rear-left, and rear-right wheel-brake cylinder pressures are built up, held, or reduced independently of each other. Each of the hydraulic pressure control actuators of hydraulic modulator 7 is comprised of a proportional solenoid valve such as an electromagnetically-controlled solenoid valve that regulates the wheel-brake cylinder pressure to a desired pressure level. Each of the electromagnetically-controlled solenoid valves of hydraulic modulator 7 is responsive to a command signal from a braking/driving force control unit, simply an electronic control unit (ECU) 8, for regulating the wheel-cylinder pressure of each of wheel-brake cylinders 6FL-6RR in response to the command signal value from ECU 8, regardless of the braking action (brake-pedal depression) manually created by the driver's foot.

The automotive VDC system equipped rear-wheel-drive vehicle of the embodiment of FIG. 1 also includes an electronic driving torque control unit 12 that controls a driving torque transmitted to rear road wheels 5RL and 5RR serving as drive wheels, by controlling an operating condition of an engine 9, a selected transmission ratio of automatic transmission 10, and/or a throttle opening of a throttle valve 11 (correlated to an accelerator opening Acc). Concretely, the operating condition of engine 9 can be controlled by controlling the amount of fuel injected or an ignition timing. Also, the engine operating condition can be controlled by the throttle opening control. Driving torque control unit 12 is designed to individually control the driving torque transmitted to rear road wheels 5RL and 5RR (drive wheels). Additionally, driving torque control unit 12 is responsive to a driving-torque command signal from ECU 8 in a manner so as to control the driving torque depending on the driving-torque command signal value.

The automotive VDC system equipped rear-wheel-drive vehicle of the embodiment of FIG. 1 also includes a stereo-camera with a charge-coupled device (CCD) image sensor, simply, a charge-coupled device (CCD) camera 13 and a camera controller 14 as an external recognizing sensor, which functions to detect a position of the VDC system equipped vehicle (the host vehicle) within the driving lane (the host vehicle's traffic lane) and whose sensor signal is used for lane deviation prevention (LDP) control. Within camera controller 14, on the basis of an image-processing image data in front of the host vehicle and captured by CCD camera 13, a lane marker or lane marking, such as a white line, is detected and thus the current host vehicle's traffic lane, in other words, the current position of the host vehicle within the host vehicle's lane, is detected. Additionally, the processor of camera controller 14 calculates or estimates, based on the image data from CCD camera 13 indicative of the picture image, a host vehicle's yaw angle φ with respect to the sense of the current host vehicle's driving lane, a host vehicle's lateral displacement or a host vehicle's lateral deviation X from a central axis of the current host vehicle's driving lane, a curvature β of the current host vehicle's driving lane, and a lane width L of the current driving lane. When the lane marker or lane marking, such as a white line, in front of the host vehicle, has worn away or when the lane markers or lane markings are partly covered by snow, it is impossible to precisely certainly recognize the lane markers or lane markings. In such a case, each of detection parameters, that is, the host vehicle's yaw angle φ, lateral deviation X, curvature β, and lane width L is set to "0". In contrast, in presence of a transition from a white-line recognition enabling state that the lane marking, such as a white line, can be recognized continually precisely to a white-line recognition partly disabling state that the lane marking, such as a white line, cannot be recognized for a brief moment, owing to noise or a frontally-located obstacle, parameters φ, X, β, and L are held at their previous values $\phi_{(n-1)}$, $X_{(n-1)}$, $\beta_{(n-1)}$, and $L_{(n-1)}$ calculated by camera controller 14 one cycle before.

Electronic control unit (ECU) 8 generally comprises a microcomputer that includes a central processing unit (CPU) or a microprocessor (MPU), memories (RAM, ROM), and an input/output interface (I/O). In addition to the signals indicative of parameters φ, X, β, and L calculated by camera controller 14, and the signal indicative of a driving torque Tw, controlled and produced by driving-torque control unit 12, the input/output interface (I/O) of ECU 8 receives input information from various engine/vehicle switches and sensors, such as an acceleration sensor 15, a yaw rate sensor 16, a master-cylinder pressure sensor 17, an accelerator opening sensor 18, a steer angle sensor 19, front-left, front-right, rear-left, and rear-right wheel speed sensors 22FL, 22FR, 22RL, and 22RR, and a direction indicator switch 20. As seen from the system block diagram of FIG. 1, for mutual communication via a data link, ECU 8 is electrically connected to driving torque control unit 12. Acceleration sensor 15 is provided to detect a longitudinal acceleration Xg and a lateral acceleration Yg, exerted on the host vehicle. Yaw rate sensor 16 (serving as a driving condition detection means) is provided to detect a yaw rate φ' resulting from a yaw moment acting on the host vehicle. Master-cylinder pressure sensor 17 is provided to detect a master-cylinder pressure Pm of master cylinder 3, that is, the amount of depression of brake pedal 1. Accelerator opening sensor 18 is provided to detect an accelerator opening Acc (correlated to a throttle opening), which is dependent on a manipulated variable of the driver's accelerator-pedal depression. Steer angle sensor 19 (serving as a turning condition detection means) is provided to detect steer angle δ of a steering wheel 21. Front-left, front-right, rear-left, and rear-right wheel speed sensors 22FL, 22FR, 22RL, and 22RR are provided respectively to detect front-left, front-right, rear-left, and rear-right wheel speeds $Vw_{FL}$, $Vw_{FR}$, $Vw_{RL}$, and $Vw_{RR}$, which are collectively referred to as "Vwi". Direction indicator switch 20 is provided to detect whether a direction indicator is turned on and also to detect the direction indicated by the direction indicator, and to output a direction indicator switch signal WS. In the presence of a directionality or polarity concerning left or right directions of each of the vehicle driving state indicative data, namely, yaw rate φ', lateral acceleration Yg, steer angle δ, yaw angle φ, and lateral deviation X, a change in the vehicle driving state indicative data to the left is indicated as a positive value, while a change in the vehicle driving state indicative data to the right is indicated as a negative value. More concretely, during a left turn, yaw rate φ', lateral acceleration Yg, steer angle δ, and yaw angle φ are all indicated as positive values. Conversely during a right turn, these parameters φ', Yg, δ, and φ are all indicated as negative values. On the other hand, lateral deviation X is indicated as a positive value when the host vehicle is deviated from the central axis of the current driving lane to the left. Conversely when the host vehicle is deviated from the central axis of the current driving lane to the right, lateral deviation X is indicated as a negative value. The positive signal value of direction indicator switch signal WS from direction indicator switch 20 means a left turn (counterclockwise rotation of direction indicator switch 20), whereas the negative signal value of direction indicator switch signal WS from direction indicator switch 20 means a right turn (clockwise rotation of direction indicator switch 20). ECU 8 is also connected to a warning system 23 having a warning buzzer and/or a warning light, which comes on in response to an alarm signal AL from ECU 8, so that a visual and/or audible warning is signaled to the driver. Within ECU 8 when there is a possibility of the host vehicle's lane deviation, the central processing unit (CPU) allows the access by the I/O interface of input informational data signals from the previously-discussed engine/vehicle switches and sensors and camera controller 14 and driving torque control unit 12, and is responsible for carrying various control programs stored in the memories and capable of performing necessary arithmetic and logic operations. Computational results or arithmetic calculation results, in other words, calculated output signals or control command signals are relayed via the output interface circuitry to the output stages, for example, the solenoids of hydraulic modulator 7 and the warning buzzer/warning light of warning system 23.

Figure 2:
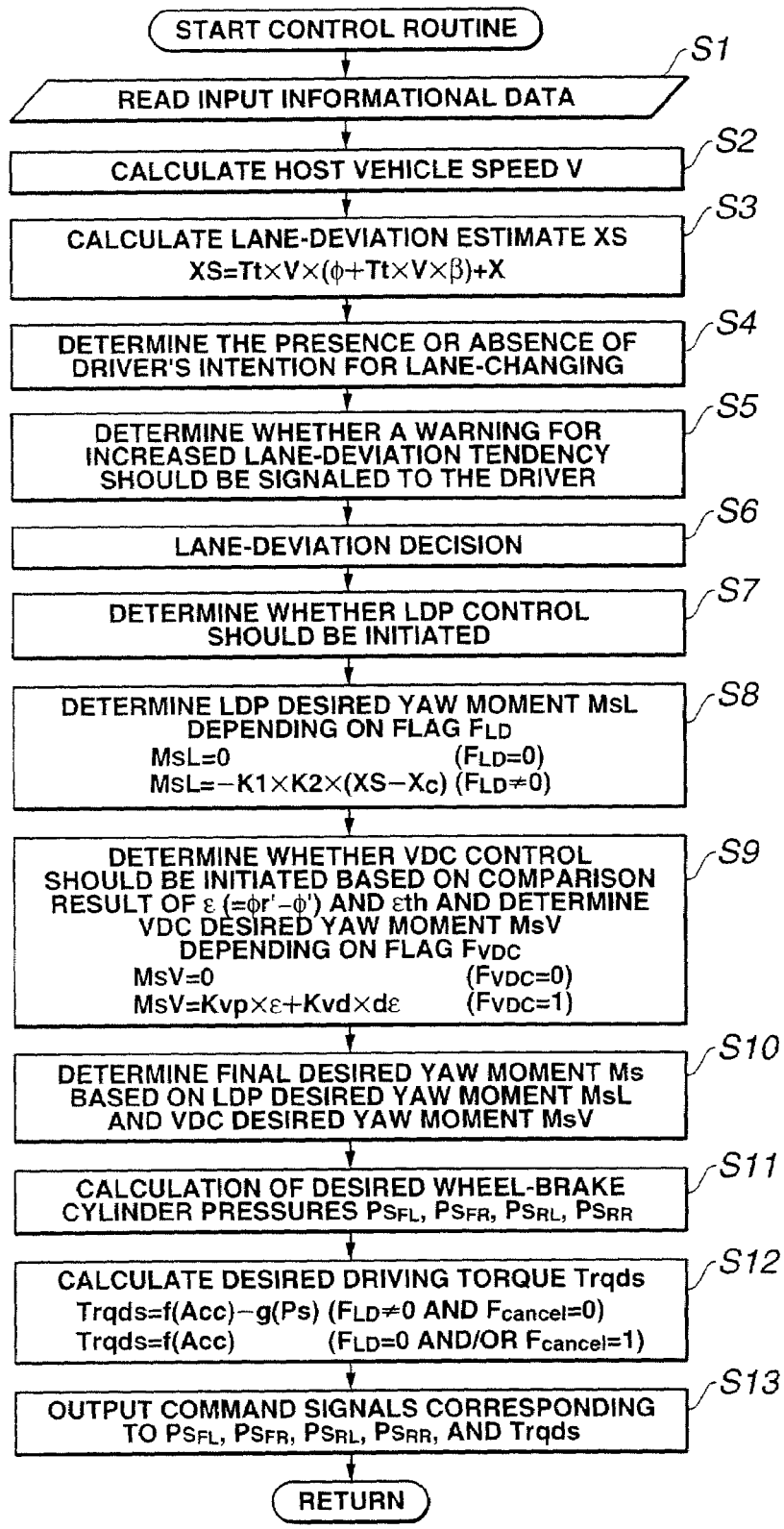
FIG. 2 is a flow chart showing a control routine (arithmetic and logic operations) executed within a braking/driving force control unit incorporated in the vehicle dynamics control apparatus of the embodiment shown in FIG. 1.

The control routine executed by ECU 8 is hereunder described in detail in reference to the flow chart shown in FIG. 2. The control routine of FIG. 2 is executed as time-triggered interrupt routines to be triggered every predetermined sampling time intervals ΔT such as 10 milliseconds.

At step S1, input informational data from the previously-noted engine/vehicle switches and sensors, and driving-torque controller 12 and camera controller 14 are read. Concretely, read are engine/vehicle switch/sensor signal data, such as the host vehicle's longitudinal acceleration Xg, lateral acceleration Yg, yaw rate φ', wheel speeds Vwi ($Vw_{FL}$, $Vw_{FR}$, $Vw_{RL}$, $Vw_{RR}$), accelerator opening Acc, master-cylinder pressure Pm, steer angle δ, and direction indicator switch signal WS, and the signal data from driving-torque control unit 12 such as driving torque Tw, and the signal data from camera controller 14 such as the host vehicle's yaw angle φ with respect to the direction of the current host vehicle's driving lane, lateral deviation X from the central axis of the current host vehicle's driving lane, curvature β of the current driving lane, and lane width L of the current driving lane. The host vehicle's yaw angle φ may be calculated by integrating yaw rate φ' detected by yaw rate sensor 16.

At step S2, a host vehicle's speed V is calculated as a simple average value (($Vw_{FL}$+$Vw_{FR}$)/2) of front-left and front-right wheel speeds $Vw_{FL}$ and $Vw_{FR}$ (corresponding to wheel speeds of driven road wheels 5FL and 5FR), from the expression V=($Vw_{FL}$+$Vw_{FR}$)/2.

At step S3, a lane-deviation estimate XS, in other words, an estimate of a future lateral deviation, is estimated or arithmetically calculated based on the latest up-to-date information concerning the host vehicle's yaw angle φ with respect to the direction of the current host vehicle's driving lane, lateral deviation X from the central axis of the current host vehicle's driving lane, curvature β of the current host vehicle's driving lane, and the host vehicle's speed V calculated through step S2, from the following expression (1).

$$XS = Tt \times V \times (\phi + Tt \times V \times \beta) + X \qquad (1)$$

where Tt denotes a headway time between the host vehicle and the preceding vehicle both driving in the same sense and in the same lane, and the product (Tt×V) of the headway time Tt and the host vehicle's speed V means a distance between the current position of the host vehicle and the forward point-of-fixation. That is, an estimate of lateral deviation from the central axis of the current host vehicle's driving lane, which may occur after the headway time Tt, is regarded as an estimate of a future lateral deviation, that is, a lane-deviation estimate XS. In the shown embodiment, ECU 8 determines that there is a possibility or an increased tendency of lane deviation of the host vehicle from the current driving lane, when lane-deviation estimate XS becomes greater than or equal to a predetermined lane-deviation criterion $X_C$. In the same manner as the actual lateral deviation X, a positive lane-deviation estimate XS means lane deviation to the left, whereas a negative lane-deviation estimate XS means lane deviation to the right. Exactly speaking, although the amount of lane deviation corresponds to a lateral displacement of the host vehicle from the lane marker of the host vehicle's driving lane, in the system of the embodiment lane-deviation estimate XS is regarded as the amount of lane deviation, because of lateral-deviation estimation based on the host vehicle's lateral displacement from the central axis (reference axis) of the current host vehicle's driving lane.

At step S4, a check is made to determine, based on direction indicator switch signal WS from direction indicator switch 20 and steer angle δ detected by steer angle sensor 19, whether a driver's intention for lane changing is present or absent.

Concretely, at step S4, a check is made to determine whether direction indicator switch 20 is turned on. When direction indicator switch 20 is turned on, a further check is made to determine whether the sign of direction indicator switch signal WS is identical to the sign of lane-deviation estimate XS calculated through step S3. When the signs of direction indicator switch signal WS and lane-deviation estimate XS are identical to each other, the processor of ECU 8 determines that the host vehicle is conditioned in the lane changing state and thus a lane-changing indicative flag $F_{LC}$ is set to "1". Conversely when the signs of direction indicator switch signal WS and lane-deviation estimate XS are not identical to each other, the processor of ECU 8 determines that the host vehicle is not conditioned in the lane changing state but there is an increased tendency of the host vehicle's lane deviation, and thus lane-changing indicative flag $F_{LC}$ is reset to "0". Actually, lane-changing indicative flag $F_{LC}$ is held at "1" for a predetermined time interval, such as four seconds, from the time when lane-changing indicative flag $F_{LC}$ has been set to "1" by turning the direction indicator switch 20 on. This is because there is a possibility that direction indicator switch 20 is manually turned off during lane-changing and thus the LDP control may be engaged undesirably. More concretely, a check is made to determine whether direction indicator switch 20 has been switched from the turned-on state to the turned-off state. When switching from the turned-on state to turned-off state has occurred, ECU 8 determines that the current point of time corresponds to the time just after lane-changing operation, and thus a further check is made to determine whether the predetermined time interval, for example four seconds, measured or counted from the time when switching from the turned-on state of direction indicator switch 20 to turned-off state has occurred, has expired. When the predetermined time interval has expired, lane-changing indicative flag $F_{LC}$ is reset to "0".

Taking into account the driver's steering operation under a condition that direction indicator switch 20 remains turned off, a still further check for the presence or absence of the driver's intention for lane changing is made based on steer angle δ and a variation Δδ in steer angle δ. Concretely, with direction indicator switch 22 turned off, a check is made to determine whether steer angle δ is greater than or equal to a predetermined steer angle $δ_s$, and additionally a variation Δδ in steer angle δ is greater than or equal to a predetermined steer-angle change $Δδ_s$. In case of $δ ≧ δ_s$ and $Δδ ≧ Δδ_s$, ECU 8 determines that a driver's intention for lane changing is present, and thus lane-changing indicative flag $F_{LC}$ is set to "1". Conversely in case of $δ < δ_s$ or $Δδ < Δδ_s$, ECU 8 determines that a driver's intention for lane changing is absent, and thus lane-changing indicative flag $F_{LC}$ is reset to "0". Thereafter, the routine proceeds from step S4 to step S5 (described later).

As discussed above, in the shown embodiment, the presence or absence of the driver's intention for lane changing is determined based on both of steer angle δ and its change Δδ. In lieu thereof, the presence or absence of the driver's intention for lane changing may be determined based on the magnitude of steering torque acting on the steering wheel.

At step S5, a check is made to determine, based on the absolute value |XS| of lane-deviation estimate XS (exactly, a comparison result of lane-deviation estimate absolute value |XS| and a predetermined alarm criterion $X_W$)) and setting or resetting of lane-changing indicative flag $F_{LC}$, whether a visual and/or audible warning for the increased host vehicle's lane-deviation tendency should be signaled to the driver. Concretely, a check is made to determine whether lane-changing indicative flag $F_{LC}$ is reset to "0" and additionally the absolute value |XS| of lane-deviation estimate XS is greater than or equal to predetermined alarm criterion $X_W$ (exactly, a predetermined alarm criterion threshold value). Predetermined alarm criterion $X_W$ is obtained by subtracting a predetermined margin $X_m$ (a predetermined constant) from predetermined lane-deviation criterion $X_C$ (see the following expression (2)).

$$X_W = X_C - X_m \quad (2)$$

where predetermined lane-deviation criterion $X_C$ means a preset criterion threshold value of lateral displacement of the host vehicle from the central axis of the current host vehicle's driving lane, and predetermined margin $X_m$ corresponds to a margin from a time when warning system 23 has been switched to an operative state to a time when the LDP function has been engaged or enabled. In case of $F_{LC}=0$ and $|XS| ≧ X_W$, ECU 8 determines that the host vehicle is in a lane-deviation state where there is an increased tendency for the host vehicle to deviate from the current host vehicle's driving lane, and thus the output interface of ECU 8 generates alarm signal AL to warning system 23. On the contrary, in case of $F_{LC}=1$ or $|XS|<X_W$, ECU 8 determines that the host vehicle is out of the lane-deviation state, and thus another check is made to determine whether warning system 23 is in operation. During operation of warning system 23, another check is made to determine whether the absolute value |XS| of lane-deviation estimate XS is less than a difference ($X_W - X_h$) between predetermined alarm criterion $X_W$ and a predetermined hysteresis $X_h$. Predetermined hysteresis $X_h$ is provided to avoid undesirable hunting for warning system 23. In case of $|XS|<(X_W-X_h)$, warning system 23 is deactivated by stopping the output of alarm signal AL to warning system 23. That is to say, until the lane-deviation estimate XS is transferred to the state defined by $|XS|<(X_W-X_h)$ after warning system 23 has been activated, the warning operation of warning system 23 is continually executed. In the system of the shown embodiment, the visual and/or audible warning (the output of alarm signal AL to warning system 23) is dependent upon only the amount of lane deviation (i.e., lane-deviation estimate XS).

At step S6, the processor of ECU 8 makes a lane-deviation decision. Concretely, at step S6, a check is made to determine whether lane-deviation estimate XS is greater than or equal to predetermined lane-deviation criterion $X_C$ (a positive lane-deviation criterion). For instance, predetermined lane-deviation criterion $X_C$ is set to 0.8 meter, since a width of a traffic lane of an express-highway in Japan is 3.35 meters. In case of $XS \geq X_C$, ECU 8 determines that there is an increased tendency for the host vehicle to deviate from the current driving lane to the left, and thus a lane-deviation decision flag $F_{LD}$ is set to "+1". On the contrary, in case of $XS < X_C$, another check is made to determine whether lane-deviation estimate XS is less than or equal to a negative value $-X_C$ of predetermined lane-deviation criterion $X_C$. In case of $XS \leq -X_C$, ECU 8 determines that there is an increased tendency for the host vehicle to deviate from the current driving lane to the right, and thus lane-deviation decision flag $F_{LD}$ is set to "−1". Alternatively, when the condition defined by $XS \geq X_C$ and $XS \leq -X_C$ are both unsatisfied, that is, in case of $-X_C < XS < X_C$, ECU 8 determines that there is a less possibility of the host vehicle's lane deviation from the current driving lane to the right or to the left, and thus lane-deviation decision flag $F_{LD}$ is reset to "0". Thereafter, a further check is made to determine whether lane-changing indicative flag $F_{LC}$ is set to "1". In case of $F_{LC}=1$, lane-deviation decision flag $F_{LD}$ is forcibly reset to "0". In case of $F_{LC}=0$, a check is made to determine whether lane-deviation decision flag $F_{LD}$ is reset to "0". In case of $F_{LD}=0$, an LDP control canceling flag or an LDP control inhibiting flag $F_{cancel}$ is reset to "0".

In case of $F_{LD}=1$, at step S7, a check is made to determine whether LDP control should be initiated. Actually, historical data of lane-deviation estimate XS, calculated through step S3, are stored in predetermined memory addresses of the RAM of ECU 8. Then, the continuity or discontinuity of lane-deviation estimate XS is determined based on the historical data of lane-deviation estimate XS. Concretely, a check is made to determine whether the absolute value $|XS_{(n-1)} - XS_{(n)}|$ of the difference between the previous value $XS_{(n-1)}$ of lane-deviation estimate XS and the current value $XS_{(n)}$ of lane-deviation estimate XS is greater than or equal to a predetermined threshold value $L_{XS}$, which is provided to determine the continuity or discontinuity of lane-deviation estimate XS. More concretely, in case of $F_{LD} \neq 0$ (that is, $F_{LD}=1$ or $-1$) and $|XS_{(n-1)} - XS_{(n)}| \geq L_{XS}$, ECU 8 determines that lane-deviation estimate XS is discontinuous and thus LDP control inhibiting flag $F_{cancel}$ is set to "1". Conversely, in case of $|XS_{(n-1)} - XS_{(n)}| < L_{XS}$, ECU 8 determines that lane-deviation estimate XS is continuous. LDP control inhibiting flag $F_{cancel}$ is reset to "0" when lane-deviation decision flag $F_{LD}$ is switched to "0". In other words, LDP control inhibiting flag $F_{cancel}$ is maintained at "0", until lane-deviation decision flag $F_{LD}$ is transferred from the state of $F_{LD} \neq 0$ to the state of $F_{LD}=0$.

Figure 3:
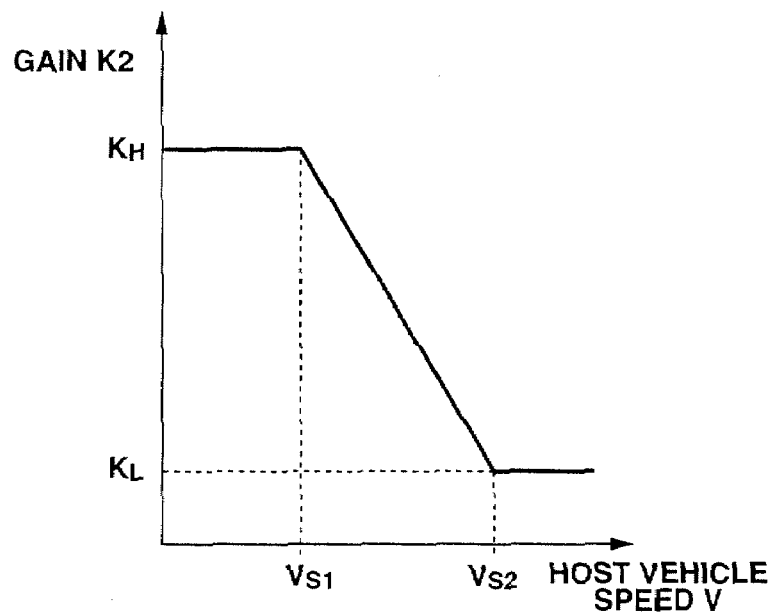
FIG. 3 is a predetermined host vehicle's speed V versus gain K2 characteristic map.

At step S8, a desired yaw moment MsL for LDP control, simply an LDP desired yaw moment, is arithmetically calculated based on lane-deviation estimate XS and predetermined lane-deviation criterion $X_C$, depending on whether lane-deviation decision flag $F_{LD}$ is conditioned in the state of $F_{LD} \neq 0$ or the state of $F_{LD}=0$. In the system of the embodiment, the positive LDP desired yaw moment MsL means a component of the moment vector tending to rotate the host vehicle about the z-axis counterclockwise (to the left) when looking in the positive direction of the z-axis. The negative LDP desired yaw moment MsL means a component of the moment vector tending to rotate the host vehicle about the z-axis clockwise (to the right), when looking in the positive direction of the z-axis. Concretely, at step S8, only when lane-deviation decision flag $F_{LD}$ is unequal to "0", that is, $F_{LD} \neq 0$, LDP desired yaw moment MsL is arithmetically calculated based on lane-deviation estimate XS and predetermined lane-deviation criterion $X_C$, from the following expression (3).

$$MsL = -K1 \times K2 \times (XS - X_C) \quad (3)$$

where K1 denotes a proportional gain or a proportional coefficient that is determined by specifications of the host vehicle, and K2 denotes a proportional gain or a variable gain that varies depending on the host vehicle's speed V. Gain K2 is calculated or retrieved from the preprogrammed vehicle-speed V versus gain K2 characteristic map of FIG. 3 showing how a gain K2 has to be varied relative to a host vehicle's speed V. As can be appreciated from the preprogrammed characteristic map of FIG. 3 showing the relationship between gain K2 and vehicle speed V, in a low speed range ($0 \leq V \leq V_{S1}$) from 0 to a predetermined low speed value $V_{S1}$, gain K2 is fixed to a predetermined relatively high gain $K_H$. In a middle and high speed range ($V_{S1} < V \leq V_{S2}$) from the predetermined low speed value $V_{S1}$ to a predetermined high speed value $V_{S2}$ (higher than $V_{S1}$), gain K2 gradually reduces to a predetermined relatively low gain $K_L$, as the host vehicle's speed V increases. In an excessively high speed range ($V_{S2} < V$) above predetermined high speed value $V_{S2}$, gain K2 is fixed to predetermined relatively low gain $K_L$.

Conversely in case of $F_{LD}=0$, LDP desired yaw moment MsL is set to "0".

At step S9, a VDC desired yaw moment MsV, corresponding to the controlled variable for VDC control, is arithmetically calculated based on a yaw-rate deviation $\epsilon$ ($=\phi r' - \phi'$) between a final desired yaw rate $\phi r'$ and actual yaw rate $\phi'$ detected by yaw rate sensor 16 and resulting from the yaw moment acting on the host vehicle, and a sideslip angle $\gamma$ (described later). Yaw-rate deviation $\epsilon$ ($=\phi r' - \phi'$) and sideslip angle $\gamma$ both serve as criteria used to determine whether the host vehicle is in a stable driving state (a good driving stability) or in an unstable driving state (a poor driving stability).

Figure 4:
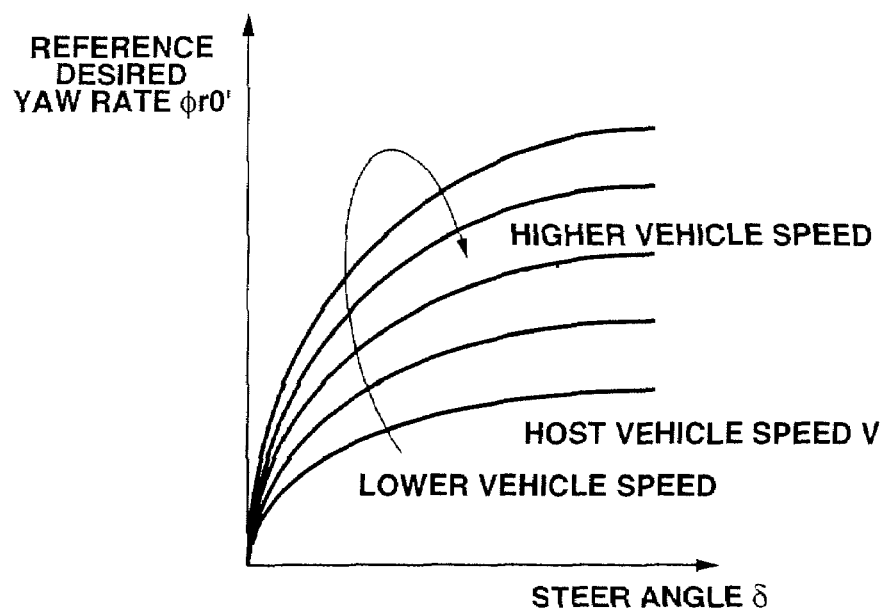
FIG. 4 is a predetermined control map showing the relationship among a host vehicle's speed V, a steering angle $\delta$, and a reference desired yaw rate $\phi r0'$.

First, reference desired yaw rate $\phi r0'$ is retrieved based on steer angle $\delta$ and host vehicle's speed V from the predetermined $V-\delta-\phi r0'$ characteristic map shown in FIG. 4. In FIG. 4, the axis of abscissa (the x-axis) indicates steer angle $\delta$, the axis of ordinate (the y-axis) indicates reference desired yaw rate $\phi r0'$. As shown in FIG. 4, when steer angle $\delta$ is "0", reference desired yaw rate $\phi r0'$ is "0". At the initial stage that steer angle $\delta$ begins to increase from "0", reference desired yaw rate $\phi r0'$ tends to quickly increase in accordance with an increase in steer angle $\delta$. Thereafter, in accordance with a further increase in steer angle $\delta$, reference desired yaw rate $\phi r0'$ tends to moderately increase parabolically. On the other hand, at the initial stage that host vehicle's speed V begins to increase from a low speed value, for the same steer angle, reference desired yaw rate $\phi r0'$ tends to increase in accordance with an increase in host vehicle's speed V. Thereafter, as soon as host vehicle's speed V exceeds a predetermined vehicle-speed threshold value, for the same steer angle, reference desired yaw rate $\phi r0'$ tends to decrease in accordance with an increase in host vehicle's speed V.

Second, reference desired yaw rate $\phi r0'$ is compensated for based on a coefficient of road-surface friction. Concretely, in order to derive a friction-dependent desired yaw rate correction value, simply a desired yaw rate correction value $\phi rh'$, reference desired yaw rate $\phi r0'$ is compensated for based on lateral acceleration Yg, exactly based on a lateral-acceleration dependent yaw-rate upper limit, simply a yaw-rate limit $\phi lim'$ in accordance with the following expression (4).

$$\phi rh' = \min(\phi r0', \phi lim') \quad (4)$$

The aforementioned expression $\phi rh' = \min(\phi r0', \phi lim')$ means a so-called select-LOW process through which a smaller one of reference desired yaw rate $\phi r0'$ and yaw-rate limit $\phi lim'$ is selected as desired yaw rate correction value $\phi rh'$. Yaw-rate limit φlim' is arithmetically calculated based on lateral acceleration Yg and host vehicle's speed V from the following expression (5).

$$\phi lim' = Km \times (Yg/V) \quad (5)$$

where Km denotes a correction factor that is set to a predetermined constant value, such as 1.25, taking into account a delay of development of lateral acceleration Yg.

Lateral acceleration Yg exerted on the vehicle tends to reduce, as the road-surface friction coefficient μ decreases. For this reason, during driving on low-μ roads, yaw-rate limit φlim' is set to a comparatively small value, and thus reference desired yaw rate φr0' is compensated for and limited to a smaller value.

In the system of the embodiment, reference desired yaw rate φr0' is compensated for and limited based on lateral acceleration Yg, which is correlated to the road-surface friction coefficient μ. In lieu thereof, the road-surface friction coefficient μ itself may be estimated, and desired yaw rate correction value φrh' may be arithmetically calculated from the following expression (6), so that reference desired yaw rate φr0' is compensated for directly based on the road-surface friction coefficient μ.

$$\phi rh' = \mu \times \phi r0' \quad (6)$$

Third, sideslip angle γ is arithmetically calculated from the following expression (7).

$$\gamma = d\gamma + \gamma_0 \quad (7)$$

where $\gamma_0$ denotes a previous sideslip angle calculated one cycle before and dγ denotes a variation (a rate-of-change) in sideslip angle γ with respect to a predetermined time interval and arithmetically calculated from an expression dγ=−φ'+(Yg/V) where φ' denotes the actual yaw rate, Yg denotes the lateral acceleration, and V denotes the host vehicle's speed.

That is, as appreciated from the aforesaid expressions dγ=−φ'+(Yg/V) and γ=dγ+γ₀, sideslip-angle variation dγ is arithmetically calculated based on all of the actual yaw rate φ', lateral acceleration Yg, and host vehicle's speed V, and thereafter sideslip angle γ is calculated by integrating the sideslip-angle variation dγ. Instead of deriving sideslip angle γ (sideslip-angle variation dγ) by way of arithmetic calculation based on vehicle dynamic behavior indicative sensor values such as actual yaw rate φ', lateral acceleration Yg, and host vehicle's speed V, sideslip angle γ may be estimated and determined by way of sideslip-angle estimation based on sensor signal values such as actual yaw rate φ' detected by the yaw rate sensor, lateral acceleration Yg detected by the lateral-G sensor, host vehicle's speed V detected by the vehicle speed sensor, steer angle δ detected by the steer angle sensor, and a vehicle model such as a two-wheel model, in other words, by way of an observer function.

Fourth, a desired sideslip angle γr is arithmetically calculated based on desired yaw rate correction value φrh', exactly a desired lateral velocity Vyc in accordance with the following expression (8), that is, a steady-state formula for the two-wheel model.

$$\gamma r = Vyc/V \quad (8)$$

where Vyc denotes the desired lateral velocity and V denotes the host vehicle's speed. Desired lateral velocity Vyc of the above expression (8) is arithmetically calculated from the following expression (9).

$$Vyc = (Lr - Kc \times V^2) \times \phi rh' \quad (9)$$

where Kc denotes a constant that is determined by specifications of the host vehicle and Lr denotes a distance from the center of gravity of the host vehicle to the rear axle. Constant Kc of the above expression (9) is arithmetically calculated from the following expression (10).

$$Kc = (m \times Lf)/(2 \times L \times CPr) \quad (10)$$

where L denotes a wheelbase of the host vehicle, Lf denotes a distance from the center of gravity of the host vehicle to the front axle, CPr denotes a rear-wheel cornering power, and m denotes a vehicle weight (a mass of the host vehicle).

Fifth, final desired yaw rate φr' is calculated by further compensating for desired yaw rate correction value φrh' based on the actual sideslip angle γ and desired sideslip angle γr (see the following expression (11)).

$$\phi r' = \phi rh' - (Kbp \times d\Gamma + Kbd \times dd\Gamma) \quad (11)$$

where dΓ denotes a deviation (γ−γr) between actual sideslip angle γ and desired sideslip angle γr, ddΓ denotes a variation d(γ−γr) of sideslip-angle deviation dγ with respect to a predetermined time interval such as 50 milliseconds, and Kbp and Kbd denote control gains. In the shown embodiment, control gains Kbp and Kbd are fixed to respective constant values. In lieu thereof, these gains Kbp and Kbd may be set as variables that are determined depending on the host vehicle speed.

As set out above in reference to step S9 of FIG. 2, according to the system of the embodiment, by compensating for reference desired yaw rate φr0', exactly desired yaw rate correction value φrh', the VDC control can be performed, taking account of the sideslip angle (exactly, the sideslip-angle deviation dΓ(=γ−γr) between actual sideslip angle γ and desired sideslip angle γr and/or rate-of-change ddΓ=d(γ−γr) of sideslip-angle deviation dΓ) as well as yaw-rate deviation ε(=φr'−φ') between final desired yaw rate φr' and actual yaw rate φ'. Concretely, when desired sideslip angle γr is relatively greater than actual sideslip angle γ, that is, γ<γr, the sign of (Kbp×dΓ+Kbd×ddΓ) of the right-hand side of the expression (11), i.e., φr'=φrh'−(Kbp×dΓ+Kbd×ddΓ), becomes negative, because dΓ(=γ−γr) and ddΓ (=d(γ−γr)) are negative, and thus final desired yaw rate φr' is represented by φr'=φrh'+|Kbp×dΓ+Kbd×ddΓ|. That is, in case of γ<γr, in order to enhance vehicle driveability or maneuverability, and thus to ensure easy change of vehicle heading or easy turning, final desired yaw rate φr', tends to increase. Conversely when desired sideslip angle γr is relatively less than or equal to actual sideslip angle γ, that is, γ≧γr, the sign of (Kbp×dΓ+Kbd×ddΓ) of the right-hand side of the expression (11), i.e., φr'=φrh'−(Kbp×dΓ+Kbd×ddΓ), becomes positive, because dΓ(=γ−γr) and ddΓ(=d(γ−γr)) are positive, and thus final desired yaw rate φr' is represented by φr'=φrh'−|Kbp×dΓ+Kbd×ddΓ|. That is, in case of γ≧γr, in order to enhance vehicle driving stability, final desired yaw rate φr' tends to decrease.

Sixth, a check is made to determine whether the VDC control should be initiated. Actually, a yaw-rate deviation ε(=φr'−φ') between the previously-noted final desired yaw rate φr' and actual yaw rate φ' is compared to a yaw-rate-deviation threshold value εth. Yaw-rate-deviation threshold value εth is calculated or retrieved from a preprogrammed vehicle-speed V versus yaw-rate-deviation threshold value εth characteristic map (not shown) showing how a yaw-rate-deviation threshold value εth has to be varied relative to a host vehicle's speed V. For instance, in a low speed range (0≦V≦$V_{S1}$') from 0 to a predetermined low speed value $V_{S1}$', yaw-rate-deviation threshold value εth is fixed to a predetermined relatively high threshold value εthH. In a middle and high speed range ($V_{S1}'<V\leq V_{S2}'$) from the predetermined low speed value $V_{S1}'$ to a predetermined high speed value $V_{S2}'$ (higher than $V_{S1}'$), threshold value εth gradually reduces to a predetermined relatively low threshold value εthL, as the host vehicle's speed V increases. In an excessively high speed range ($V_{S2}'<V$) above predetermined high speed value $V_{S2}'$, threshold value εth is fixed to predetermined relatively low threshold value εthL. That is to say, initiation (engagement) of VDC control is determined depending upon the comparison result of yaw-rate deviation ε and yaw-rate-deviation threshold value εth under the resetting state ($F_{VDC}=0$) of VDC control indicative flag $F_{VDC}$ indicating whether the VDC control system is operative ($F_{VDC}=1$) or inoperative ($F_{VDC}=0$). Concretely, when yaw-rate deviation ε is greater than yaw-rate-deviation threshold value εth, that is, |ε|>εth, and additionally the VDC control system is held in the inoperative state, i.e., in case of $F_{VDC}=0$, the processor of ECU 8 determines that the VDC control should be initiated or engaged. That is, the inequality |ε|>εth means that the vehicle driving stability (vehicle driveability and stability) is deteriorated. Thereafter, VDC control indicative flag $F_{VDC}$ is set to "1". If the absolute value |ε| of yaw-rate deviation ε is less than or equal to yaw-rate-deviation threshold value εth (i.e., |ε|≤εth) even under a condition of $F_{VDC}=0$, VDC control indicative flag $F_{VDC}$ is continuously maintained at "0".

When the absolute value |ε| of yaw-rate deviation ε becomes less than or equal to yaw-rate-deviation threshold value εth under a condition where VDC control indicative flag $F_{VDC}$ is set (=1), and additionally the absolute value |γ| of sideslip angle γ becomes less than or equal to a predetermined sideslip-angle threshold value γth (i.e., |γ|≤γth), that is, in case of $F_{VDC}=1$ and |ε|≤εth and |γ|≤γth, the processor of ECU 8 determines that the VDC control system should be shifted to the inoperative state (the disengaged state), and thus VDC control indicative flag $F_{VDC}$ is reset (=0). Conversely when the condition defined by $F_{VDC}=1 \cap |ε|≤εth \cap |γ|≤γth$ is unsatisfied, VDC control indicative flag $F_{VDC}$ is maintained at "1".

When VDC control indicative flag $F_{VDC}$ is set (=1), that is, during the VDC operative state, VDC desired yaw moment MsV, corresponding to the controlled variable for VDC control, is arithmetically calculated based on yaw-rate deviation ε (=φr'−φ') between final desired yaw rate φr' and actual yaw rate φ', from the following expression (12).

$$MsV = Kvp \times \epsilon + Kvd \times d\epsilon \qquad (12)$$

where Kvp and Kvd denote feed-back control gains, ε denotes the yaw-rate deviation (φr'−φ'), and dε denotes a variation of yaw-rate deviation ε with respect to a predetermined time interval such as 50 milliseconds. In the shown embodiment, control gains Kvp and Kvd are fixed to respective constant values. In lieu thereof, these gains Kvp and Kvd may be set as variables that are determined depending on the host vehicle speed.

On the contrary, when VDC control indicative flag $F_{VDC}$ is reset (=0), that is, during the VDC inoperative state, VDC desired yaw moment MsV, corresponding to the controlled variable for VDC control, is set to "0". After calculation of VDC desired yaw moment MsV corresponding to the controlled variable for VDC control, the routine of FIG. 2 proceeds from step S9 to step S10.

At step S10, final desired yaw moment Ms is calculated or determined based on LDP desired yaw moment MsL (calculated through step S8) corresponding to the controlled variable for LDP control and VDC desired yaw moment MsV (calculated through step S9) corresponding to the controlled variable for VDC control.

Concretely, when the direction of yawing motion created by VDC control (that is, the sign of VDC desired yaw moment MsV) is opposite to the direction of yawing motion created by LDP control (that is, the sign of LDP desired yaw moment MsL), a higher priority is put on VDC control rather than LDP control, and therefore VDC desired yaw moment MsV corresponding to the controlled variable of VDC control is set or determined as final desired yaw moment Ms.

On the contrary, when the direction of yawing motion created by VDC control (that is, the sign of VDC desired yaw moment MsV) is identical to the direction of yawing motion created by LDP control (that is, the sign of LDP desired yaw moment MsL), in order to prevent over-control, while keeping the effects obtained by both of the VDC control and the LDP control, final desired yaw moment Ms is set or determined as a higher one of the absolute value |MsV| of VDC desired yaw moment MsV and the absolute value |MsL| of LDP desired yaw moment MsL by way of a so-called select-HIGH process shown in the following expression (13).

$$Ms = \max(|MsV|, |MsL|) \qquad (13)$$

As can be appreciated from the above expression (13), when either one of VDC desired yaw moment MsV and LDP desired yaw moment MsL is "0", the nonzero desired yaw moment of desired yaw moments MsV and MsL is selected or determined as final desired yaw moment Ms.

As discussed above, final desired yaw moment Ms is determined by way of the select-HIGH process Ms=max(|MsV|, |MsL|) under a condition where the direction of yawing motion created by VDC control (that is, the sign of VDC desired yaw moment MsV) is identical to the direction of yawing motion created by LDP control (that is, the sign of LDP desired yaw moment MsL). In lieu thereof, final desired yaw moment Ms may be determined, taking into account a summed desired yaw moment $Ms_{sum}$ (=MsV+MsL) of VDC desired yaw moment MsV and LDP desired yaw moment MsL and a yaw-moment controlled variable upper limit Mslim, which is determined depending on the host vehicle's turning degree, in other words, the degree of yawing motion, which is generally estimated by actual yaw rate φ' detected by yaw rate sensor 16 (functioning as the driving condition detection means), which also serves as a host vehicle's turning degree detection means. Concretely, as can be seen from the preprogrammed actual yaw rate φ' versus yaw-moment controlled variable upper limit Mslim characteristic map shown in FIG. 5, yaw-moment controlled variable upper limit Mslim is determined or map-retrieved based on actual yaw rate φ'. To provide a limiter for the upper limit of final desired yaw moment Ms, final desired yaw moment Ms may be determined as a smaller one of the summed desired yaw moment $Ms_{sum}$ (=MsV+MsL) and yaw-moment controlled variable upper limit Mslim by way of a select-LOW process shown in the following expression (14).

$$Ms = \min(|MsV+MsL|, Mslim) \qquad (14)$$

Figure 5:
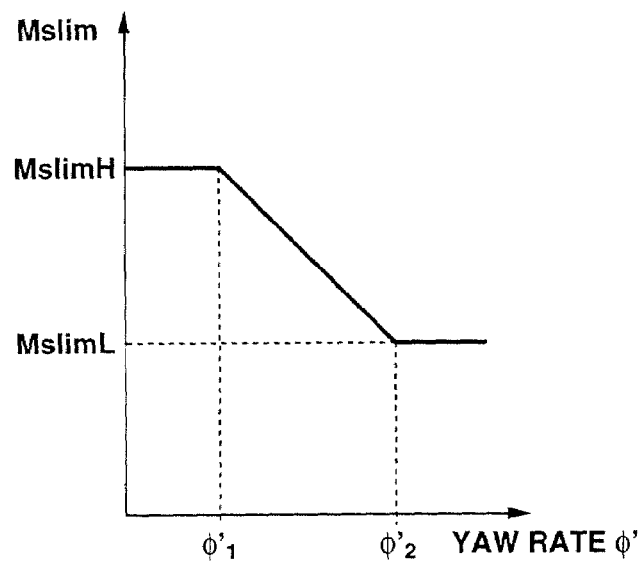
FIG. 5 is a predetermined actual yaw rate $\phi'$ versus yaw-moment controlled variable upper limit Mslim characteristic map.

As can be appreciated from the preprogrammed φ'−Mslim characteristic map of FIG. 5 showing the relationship between actual yaw rate φ' and yaw-moment controlled variable upper limit Mslim, in a low yaw rate range ($0 \leq \phi' \leq \phi_1'$) from 0 to a predetermined low yaw rate $\phi_1'$, yaw-moment controlled variable upper limit Mslim is fixed to a predetermined relatively high yaw-moment controlled variable upper limit MslimH. In a middle and high yaw rate range ($\phi_1'<\phi'\leq\phi_2'$) from the predetermined low yaw rate $\phi_1'$ to a predetermined high yaw rate $\phi_2'$ (higher than $\phi_1'$), yaw-moment controlled variable upper limit Mslim gradually reduces to a predetermined relatively low yaw-moment controlled variable upper limit MslimL, as actual yaw rate $\phi'$ increases. In an excessively high yaw rate range ($\phi_2'<\phi'$) above predetermined high yaw rate $\phi_2'$, yaw-moment controlled variable upper limit Mslim is fixed to predetermined relatively low yaw-moment controlled variable upper limit MslimL. In this manner, yaw-moment controlled variable upper limit Mslim is set or determined based on the host vehicle's turning degree, such as actual yaw rate $\phi'$, and then final desired yaw moment Ms can be properly limited depending on the host vehicle's turning degree. Thus, it is possible to produce the controlled yawing moment suited for the host vehicle's turning degree.

As set forth above, although the host vehicle's turning degree (the degree of yawing motion) is estimated by actual yaw rate $\phi'$ detected by yaw rate sensor 16, the host vehicle's turning degree may be estimated or determined based on another quantity of state representative of the turning degree, for example, lateral acceleration Yg exerted on the host vehicle.

As another way to calculate or determine final desired yaw moment Ms, weighting for both of LDP desired yaw moment MsL corresponding to the controlled variable for LDP control and VDC desired yaw moment MsV corresponding to the controlled variable for VDC control may be taken into account. Concretely, sideslip angle $\gamma$ is used as a driving condition indicative factor. A weighting factor Ka is determined or retrieved based on sideslip angle $\gamma$ from the preprogrammed sideslip angle $\gamma$ versus weighting factor Ka characteristic map shown in FIG. 6. Final desired yaw moment Ms is computed or calculated based on LDP desired yaw moment MsL, VDC desired yaw moment MsV, and the map-retrieved weighting factor Ka, from the following expression (15).

$$Ms = Ka \times MsV + (1-Ka) \times MsL \qquad (15)$$

Figure 6:
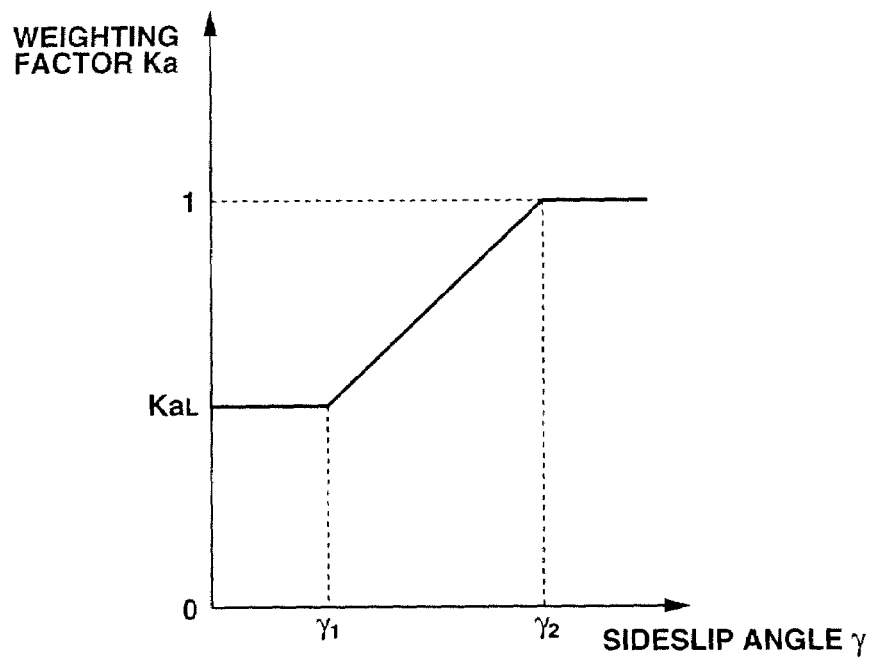
FIG. 6 is a predetermined sideslip angle $\gamma$ versus weighting factor Ka characteristic map.

As can be appreciated from the preprogrammed $\gamma$–Ka characteristic map of FIG. 6 showing the relationship between sideslip angle $\gamma$ and weighting factor Ka, in a small sideslip angle $\gamma$ range ($0 \leq \gamma \leq \gamma_1$) from 0 to a predetermined small sideslip angle $\gamma_1$, weighting factor Ka is fixed to a predetermined minimum weighting factor KaL. In a middle and large sideslip angle $\gamma$ range ($\gamma_1 \leq \gamma \leq \gamma_2$) from the predetermined small sideslip angle $\gamma_1$ to a predetermined large sideslip angle $\gamma_2$ (higher than $\gamma_1$), weighting factor Ka gradually increases to a predetermined maximum weighting factor KaH (=1), as the sideslip angle $\gamma$ increases. In an excessively large sideslip angle $\gamma$ range ($\gamma_2 < \gamma$) above predetermined large sideslip angle $\gamma_2$, weighting factor Ka is fixed to predetermined maximum weighting factor KaH (=1). In the preprogrammed $\gamma$–Ka characteristic map of FIG. 6, predetermined minimum weighting factor KaL is set to approximately "0.5", and therefore weighting factor varies within the predetermined range of KaL ($\approx$0.5) to KaH (=1). That is, a higher priority is put on a weight for VDC desired yaw moment MsV corresponding to the controlled variable for VDC control rather than a weight for LDP desired yaw moment MsL corresponding to the controlled variable for LDP control. In other words, a higher priority is put on the VDC control that is more important than the LDP control from the viewpoint of the vehicle driving stability. Additionally, as can be seen from the preprogrammed $\gamma$–Ka characteristic map of FIG. 6, weighting factor Ka (that is, the degree of priority for VDC control) tends to increase, as the sideslip angle $\gamma$ increases, that is, the necessity for VDC control increases. As set out above, in case that weighting for both of LDP desired yaw moment MsL corresponding to the controlled variable for LDP control and VDC desired yaw moment MsV corresponding to the controlled variable for VDC control is taken into account (see the expression (15)), it is possible to more effectively optimally perform the cooperative control between VDC control and LDP control, depending on the weight (the necessity) assigned to VDC control and the weighting (the necessary) assigned to LDP control.

Returning to FIG. 2, after final desired yaw moment Ms is calculated or determined through step S10, step S11 occurs.

At step S11, front-left, front-right, rear-left, and rear-right desired wheel-brake cylinder pressures $Ps_{FL}$, $Ps_{FR}$, $Ps_{RL}$ and $Ps_{RR}$ are calculated based on master cylinder pressure Pm read through step S1 and final desired yaw moment Ms determined through step S10.

Concretely, in case of $F_{LD}=0$ or $F_{cancel}=1$ and $F_{VDC}=0$, front-left and front-right desired wheel-brake cylinder pressures $Ps_{FL}$ and $Ps_{FR}$ for front wheel-brake cylinders 6FL and 6FR are set to master-cylinder pressure Pm (see the following expressions), whereas rear-left and rear-right desired wheel-brake cylinder pressures $Ps_{RL}$ and $Ps_{PR}$ for rear wheel-brake cylinders 6RL and 6RR are set to a rear-wheel brake pressure or a rear-wheel master-cylinder pressure Pmr (see the following expressions), which is calculated and usually reduced from master-cylinder pressure Pm, while taking into account wheel-brake cylinder pressure distribution between front and rear wheel brakes.

$Ps_{FL} = Pm$ $Ps_{FR} = Pm$ $Ps_{RL} = Pmr$ $Ps_{RR} = Pmr$

In contrast to the above, during operation of the VDC system ($F_{VDC} \neq 0$), exactly when the condition defined by $F_{LD}=0$ or $F_{cancel}=1$ and $F_{VDC}=0$ is unsatisfied, each of desired front and rear wheel-brake cylinder pressures $Ps_{FL}$, $Ps_{FR}$, $Ps_{RL}$ and $Ps_{RR}$ is calculated based on the magnitude of final desired yaw moment Ms. Concretely, when the absolute value |Ms| of final desired yaw moment Ms is less than a predetermined desired yaw-moment threshold value Msth, (i.e., |Ms|<Msth), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |Ms|<Msth, the front desired wheel-brake cylinder pressure difference $\Delta Ps_F$ between front-left and front-right desired wheel-brake cylinder pressures $Ps_{FL}$ and $Ps_{FR}$, and the rear desired wheel-brake cylinder pressure difference $\Delta Ps_R$ between rear-left and rear-right desired wheel-brake cylinder pressures $Ps_{RL}$ and $Ps_{RR}$ are determined as follows.

$\Delta Ps_F = 0$ $$\Delta Ps_R = 2 \times Kb_R \times |Ms|/T \qquad (16)$$

where $Kb_R$ denotes a predetermined conversion coefficient used to convert a rear-wheel braking force into a rear wheel-brake cylinder pressure and T denotes a rear-wheel tread (or a rear-wheel track). In the shown embodiment, the rear-wheel track T is set to be identical to a front-wheel track.

Conversely when the absolute value |Ms| of final desired yaw moment Ms is greater than or equal to the predetermined threshold value Msth, (i.e., |Ms|≧Msth), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the following expressions (17) and (18).

$$\Delta Ps_F = 2 \times Kb_F \times (|Ms| - Msth)/T \quad (17)$$

$$\Delta Ps_R = 2 \times Kb_R \times Msth/T \quad (18)$$

where $Kb_F$ denotes a predetermined conversion coefficient used to convert a front-wheel braking force into a front wheel-brake cylinder pressure, $Kb_R$ denotes a predetermined conversion coefficient used to convert a rear-wheel braking force into a rear wheel-brake cylinder pressure, T of the expression (17) and T of the expression (18) denote front and rear wheel treads being the same in front and rear wheels, and Msth denotes the predetermined desired yaw-moment threshold value.

In setting front and rear desired wheel-brake cylinder pressure differences $\Delta Ps_F$ and $\Delta Ps_R$ in case of |Ms|≧Msth, the system of the embodiment actually determines both of the front and rear desired brake fluid pressure differences $\Delta Ps_F$ and $\Delta Ps_R$ based on the above expressions (17) and (18). Instead of producing the desired yaw-moment controlled variable needed for VDC control or LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the following expressions (19).

$$\Delta Ps_R = 0$$

$$\Delta Ps_F = 2 \cdot Kb_F \cdot |Ms|/T \quad (19)$$

Therefore, when final desired yaw moment Ms is a negative value (Ms<0), in other words, the host vehicle tends to deviate from the current driving lane to the left, in order to produce the component of yaw moment vector needed to rotate the host vehicle to the right, front-left desired wheel-brake cylinder pressure $Ps_{FL}$ is set to master-cylinder pressure Pm, front-right desired wheel-brake cylinder pressure $Ps_{FR}$ is set to the sum (Pm+$\Delta Ps_F$) of master-cylinder pressure Pm and front desired wheel-brake cylinder pressure difference $\Delta Ps_F$, rear-left desired wheel-brake cylinder pressure $Ps_{RL}$ is set to rear-wheel master-cylinder pressure Pmr, and rear-right desired wheel-brake cylinder pressure $Ps_{RR}$ is set to the sum (Pmr+$\Delta Ps_R$) of rear-wheel master-cylinder pressure Pmr and rear desired wheel-brake cylinder pressure difference $\Delta Ps_R$ (see the following expression (20)).

$$Ps_{FL} = Pm$$

$$Ps_{FR} = Pm + \Delta Ps_F$$

$$Ps_{RL} = Pmr$$

$$Ps_{RR} = Pmr + \Delta Ps_R \quad (20)$$

On the contrary, when final desired yaw moment Ms is a positive value (Ms≧0), in other words, the host vehicle tends to deviate from the current driving lane to the right, in order to produce the component of yaw moment vector needed to rotate the host vehicle to the left, front-left desired wheel-brake cylinder pressure $Ps_{FL}$ is set to the sum (Pm+$\Delta Ps_F$) of master-cylinder pressure Pm and front desired wheel-brake cylinder pressure difference $\Delta Ps_F$, front-right desired wheel-brake cylinder pressure $Ps_{FR}$ is set to master-cylinder pressure Pm, rear-left desired wheel-brake cylinder pressure $Ps_{RL}$ is set to the sum (Pmr+$\Delta Ps_R$) of rear-wheel master-cylinder pressure Pmr and rear desired wheel-brake cylinder pressure difference $\Delta Ps_R$, and rear-right desired wheel-brake cylinder pressure $Ps_{RR}$ is set to rear-wheel master-cylinder pressure Pmr (see the following expression (21)).

$$Ps_{FL} = Pm + \Delta Ps_F$$

$$Ps_{FR} = Pm$$

$$Ps_{RL} = Pmr + \Delta Ps_R$$

$$Ps_{RR} = Pmr \quad (21)$$

Thereafter, at step S12, a desired driving torque Trqds is arithmetically calculated as detailed hereunder, under a particular condition where there is a possibility that the host vehicle tends to deviate from the current driving lane and the LDP control is operative ($F_{LD} \neq 0$). In the shown embodiment, under the specified condition defined by $F_{LD} \neq 0$ and $F_{cancel} = 0$, vehicle acceleration is reduced or suppressed by decreasing compensating for the engine output even when the accelerator pedal is depressed by the driver. Concretely, in case of $F_{LD} \neq 0$ and $F_{cancel} = 0$, desired driving torque Trqds is calculated from the following expression.

$$Trqds = f(Acc) - g(Ps)$$

where f(Acc) is a function of accelerator opening Acc read through step S1 and the function f(Acc) is provided to calculate a desired driving torque that is determined based on the accelerator opening Acc and required to accelerate the host vehicle, and g(Ps) is a function of a sum Ps ($= \Delta Ps_F + \Delta Ps_R$) of front and rear desired wheel-brake cylinder pressure differences $\Delta Ps_F$ and $\Delta Ps_R$ to be produced during the yaw moment control (VDC control or LDP control), and the function g(Ps) is provided to calculate a desired braking torque that is determined based on the summed desired wheel-brake cylinder pressure differences Ps ($= \Delta Ps_F + \Delta Ps_R$).

Therefore, when the flags $F_{LD}$ and $F_{cancel}$ are conditioned in the states defined by $F_{LD} \neq 0$ (that is, $F_{LD} = 1$ or $-1$) and $F_{cancel} = 0$, and thus the LDP control is executed, the engine torque output is reduced by the braking torque created based on the summed desired wheel-brake cylinder pressure differences Ps ($= \Delta Ps_F + \Delta Ps_R$).

On the contrary, the flags $F_{LD}$ and $F_{cancel}$ are conditioned in the states defined by $F_{LD} = 0$ and/or $F_{cancel} = 1$, desired driving torque Trqds is determined based on only the driving torque component needed to accelerate the host vehicle (see the following expression).

$$Trqds = f(Acc)$$

At step S13, command signals corresponding to front-left, front-right, rear-left, and rear-right desired wheel-brake cylinder pressures $Ps_{FL}$, $Ps_{FR}$, $Ps_{RL}$, and $Ps_{RR}$, calculated through step S11, are output from the input interface of ECU 8 to hydraulic modulator 7, and at the same time a command signal corresponding to desired driving torque Trqds, calculated through step S12, is output from the output interface of ECU 8 to driving torque control unit 12. In this manner, one cycle of the time-triggered interrupt routine (the yaw moment control routine executed by the system of the embodiment) terminates and the predetermined main program is returned.

According to the control routine shown in FIG. 2, when the absolute value |XS| of lane-deviation estimate XS becomes greater than or equal to predetermined lane-deviation criterion $X_C$ with no driver's intention for lane changing, ECU 8 determines that the host vehicle is in a lane-deviation state and thus there is an increased tendency for the host vehicle to deviate from the current host vehicle's driving lane (see step S6). Therefore, LDP desired yaw moment MsL (corresponding to the controlled variable for LDP control) is calculated based on the difference (|XS|–$X_C$) (see the expression (3) and step S8). Thereafter, when yaw-rate deviation $\epsilon(=\phi r'-\phi')$ between final desired yaw rate $\phi r'$ and actual yaw rate $\phi'$ exceeds yaw-rate-deviation threshold value $\epsilon$th, ECU 8 determines that VDC control should be initiated to enhance the driving stability. Therefore, VDC desired yaw moment MsV, corresponding to the controlled variable for VDC control, is arithmetically calculated based on yaw-rate deviation $\epsilon(=\phi r'-\phi')$ (see the expression (12) and step S9).

When the direction of yawing motion created by VDC control (that is, the sign of VDC desired yaw moment MsV) is opposite to the direction of yawing motion created by LDP control (that is, the sign of LDP desired yaw moment MsL), a higher priority is put on the VDC control rather than the LDP control, and therefore VDC desired yaw moment MsV corresponding to the controlled variable of VDC control is set or determined as final desired yaw moment Ms (see step S10). Thereafter, braking forces, that is, wheel-brake cylinder pressures for front and rear road wheels 5FL, 5FR, 5RL, and 5RR are controlled in a manner so as to achieve final desired yaw moment Ms, which is set to VDC desired yaw moment MsV.

Conversely when the direction of yawing motion created by VDC control (that is, the sign of VDC desired yaw moment MsV) is identical to the direction of yawing motion created by LDP control (that is, the sign of LDP desired yaw moment MsL), in order to prevent over-control, while keeping the effects obtained by both of the VDC control and the LDP control, the higher one of the absolute value |MsV| of VDC desired yaw moment MsV and the absolute value |MsL| of LDP desired yaw moment MsL is set or determined as final desired yaw moment Ms by way of the select-HIGH process defined by Ms=max(|MsV|, |MsL|) (see the expression (13) and step S10). Thereafter, braking forces, that is, wheel-brake cylinder pressures for front and rear road wheels 5FL, 5FR, 5RL, and 5RR are controlled in a manner so as to achieve final desired yaw moment Ms, which has been selected by the select-HIGH process defined by Ms=max(|MsV|, |MsL|).

Details of the operation of the vehicle dynamics control apparatus of the embodiment capable of executing the routine of FIG. 2 are hereunder described by reference to FIGS. 7A-7D.

Figure 7A:
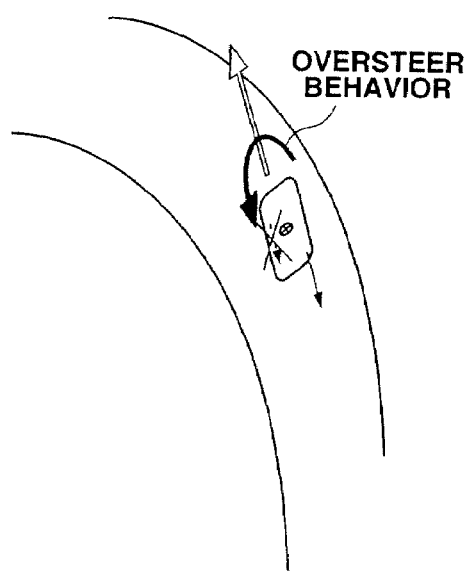
FIGS. 7A-7D are explanatory views showing control actions performed by the apparatus of the embodiment executing the control routine shown in FIG. 2 and enabling cooperative control between LDP control and VDC control, under four different vehicle dynamic behaviors, namely in presence of the host vehicle's oversteer tendency and lane deviation toward the adjacent outside lane, in presence of the host vehicle's oversteer tendency and lane deviation toward the adjacent inside lane, in presence of the host vehicle's understeer tendency and lane deviation toward the adjacent outside lane, and in presence of the host vehicle's understeer tendency and lane deviation toward the adjacent inside lane.

As shown in FIG. 7A, suppose that the host vehicle has an oversteer tendency (an oversteer behavior) during a left-hand turn and additionally the LDP control system determines that the host vehicle tends to deviate from the current driving lane toward the adjacent outside lane (to the right). Under this condition, if no signal from direction indicator switch 20 is output and there is no driver's intention for lane changing, warning system 23 comes into operation with a slight time delay from a time when the absolute value |XS| of lane-deviation estimate XS is greater than or equal to predetermined alarm criterion threshold value $X_W$. Thus, alarm signal AL is output from the output interface of ECU 8 to warning system 23 and thus the visual and/or audible warning for the increased host vehicle's lane-deviation tendency is signaled to the driver. Thereafter, when the absolute value |XS| of lane-deviation estimate XS becomes greater than or equal to the positive lane-deviation criterion $X_C$ owing to a further increase in the positive lane-deviation estimate XS from predetermined alarm criterion threshold value $X_W$, ECU 8 determines that there is an increased tendency for the host vehicle to deviate from the current traffic lane to the right. Therefore, lane-changing indicative flag $F_{LC}$ is reset to "0", because direction indicator switch 20 is not manipulated by the driver. At the same time, lane-deviation decision flag $F_{LD}$ is set to "–1", because of the host vehicle's deviation to the right. Additionally, if the rate of fluctuation of lane-deviation estimate XS is small, that is, in case of $|XS_{(n-1)}-XS_{(n)}|<L_{XS}$, LDP control inhibiting flag $F_{cancel}$ is reset to "0" (see step S7 of FIG. 2). On the basis of the difference |XS|–$X_C$, LDP desired yaw moment MsL is calculated (see the expression (3) and step S8 of FIG. 2). On the contrary, if the rate of fluctuation of lane-deviation estimate XS is large, that is, in case of $|XS_{(n-1)}-XS_{(n)}|\geq L_{XS}$ and thus lane-deviation estimate XS tends to fluctuate discontinuously, LDP control inhibiting flag $F_{cancel}$ is set to "1" (see step S7 of FIG. 2). For instance, suppose that the absolute value |XS| of lane-deviation estimate XS exceeds predetermined lane-deviation criterion $X_C$ owing to a transition from a state where a white lane marking cannot be detected by CCD camera 13 and thus lane-deviation estimate XS is temporarily set to "0" to a state where a white lane marking can be detected by CCD camera 13. In such a case, LDP desired yaw moment MsL, which is based on lane-deviation estimate XS, may be determined as a comparatively large yaw moment, if the magnitude of the absolute value |XS| of lane-deviation estimate XS is comparatively large. Thus, the comparatively large yaw moment tends to unexpectedly exert on the host vehicle and whereby the driver may feel uncomfortable. However, according to the control system of the embodiment, in case of $|XS_{(n-1)}-XS_{(n)}|\geq L_{XS}$, that is, when ECU 8 determines or predicts that the rate of fluctuation of lane-deviation estimate XS, in other words, the rate of fluctuation of yaw moment (corresponding to a controlled variable for LDP control), actively exerted on the host vehicle, is large, LDP control inhibiting flag $F_{cancel}$ is set to "1" so that the LDP control is inhibited, thus avoiding the driver from feeling uncomfortable due to an unexpectedly large yaw moment.

On the other hand, within the VDC control system, reference desired yaw rate $\phi r0'$ is retrieved based on steer angle $\delta$ and host vehicle's speed V from the predetermined V–$\delta$–$\phi r0'$ characteristic map (see FIG. 4). Thereafter, reference desired yaw rate $\phi r0'$ is compensated for based on lateral acceleration Yg (exactly based on a yaw-rate limit $\phi$lim'), which is regarded as to be equivalent to a coefficient of road-surface friction, so as to compute desired yaw rate correction value $\phi rh'$. That is, the smaller the lateral acceleration Yg, in other words, the smaller the road-surface friction coefficient, the desired yaw rate is limited to a smaller value. Furthermore, reference desired yaw rate $\phi r0'$, exactly, desired yaw rate correction value $\phi rh'$ is compensated for based on the deviation $d\Gamma(=\gamma-\gamma r)$ between actual sideslip angle $\gamma$ and desired sideslip angle $\gamma r$ and a variation $dd\Gamma$ of sideslip-angle deviation $d\Gamma$. In other words, the desired yaw rate is decreasingly compensated for in such a manner as to decrease by a value corresponding to the sum of sideslip-angle deviation $d\Gamma$ and the variation $dd\Gamma$ of sideslip-angle deviation $d\Gamma$ with respect to the predetermined time interval (see the expression (11)). When yaw-rate deviation $\epsilon(=\phi r'-\phi')$ between final desired yaw rate $\phi r'$, which is obtained by the previously-noted compensation for reference desired yaw rate $\phi r0'$, and actual yaw rate $\phi'$ is greater than yaw-rate-deviation threshold value $\epsilon$th, that is, $|\epsilon|>\epsilon$th, ECU 8 determines that the vehicle driving stability is deteriorated. Thus, VDC desired yaw moment MsV, corresponding to the controlled variable for VDC control, is arithmetically calculated based on yaw-rate deviation $\epsilon(=+r'-\phi')$ from the expression $MsV=Kvp\times\epsilon+Kvd\times d\epsilon$ (see step S9). At this time, as can be seen from the explanatory view of FIG. 7A, the direction of yaw-moment control of the LDP control system is an inward turning direction (see the arrow indicated by the phantom line in FIG. 7A), whereas the direction of yaw-moment control of the VDC control system is an oversteer-avoidance direction, that is, an outward turning direction (see the arrow indicated by the solid line in FIG. 7A). That is, the sense of the controlled variable (the controlled yaw moment) of the LDP control indicated by the phantom line is different from that of the VDC control indicated by the solid line, and thus ECU 8 incorporated in the vehicle dynamics control apparatus of the embodiment operates to put a higher priority on VDC control rather than LDP control, and therefore VDC desired yaw moment MsV is determined as final desired yaw moment Ms. Braking forces, that is, wheel-brake cylinder pressures for front and rear road wheels 5FL, 5FR, 5RL, and 5RR are controlled in a manner so as to achieve VDC desired yaw moment MsV. As a result of this, a proper yaw moment, which is needed to avoid the oversteer tendency, actively exerts on the host vehicle, thereby effectively suppressing undesired oversteer tendencies. At the same time, the host vehicle's speed is properly reduced by braking forces produced to achieve VDC desired yaw moment MsV. Additionally, owing to the controlled variable for LDP control executed just before a higher priority is put on VDC control rather than LDP control, the engine torque output can be reduced by the braking torque created based on LDP desired yaw moment MsL, thus reducing the host vehicle's speed. As discussed above, in case that the direction of yawing motion created by VDC control (that is, the sign of VDC desired yaw moment MsV) is opposite to the direction of yawing motion created by LDP control (that is, the sign of LDP desired yaw moment MsL), a higher priority is put on VDC control rather than LDP control. And thus, it is possible to prevent the controlled variable (MsL) for LDP control and the controlled variable (MsV) for VDC control from canceling out each other, even when the direction of yawing motion created by VDC control is opposite to the direction of yawing motion created by LDP control, thereby enhancing the vehicle driving stability. As discussed above, a higher priority is put on VDC control rather than LDP control under a condition where the host vehicle has an oversteer tendency during a left-hand turn and additionally the LDP control system determines that the host vehicle tends to deviate from the current driving lane toward the adjacent outside lane (to the right). Thus, it is impossible to more satisfactorily avoid the host vehicle from deviating from the current driving lane; however, it is possible to more certainly stabilize the host vehicle's dynamic behavior, which is more important than the host vehicle's lane deviation prevention.

Figure 7B:
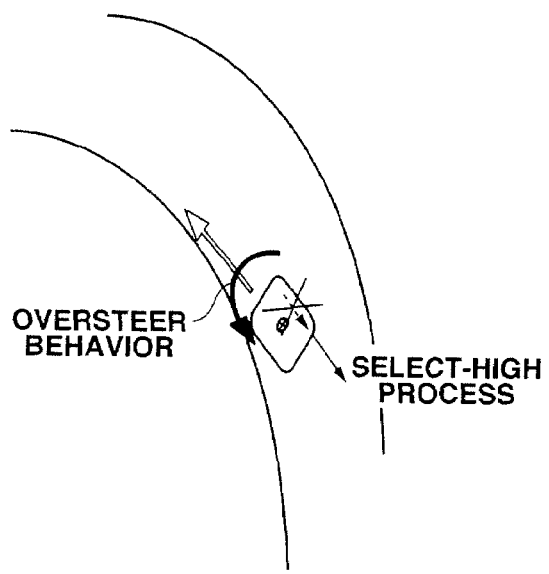

As shown in FIG. 7B, suppose that the host vehicle has an oversteer tendency during a left-hand turn and additionally the LDP control system determines that the host vehicle tends to deviate from the current driving lane toward the adjacent inside lane (to the left). As can be seen from the explanatory view of FIG. 7B, the direction of yaw-moment control of the LDP control system is an outward turning direction (see the arrow indicated by the phantom line in FIG. 7B), whereas the direction of yaw-moment control of the VDC control system is an oversteer-avoidance direction, that is, an outward turning direction (see the arrow indicated by the solid line in FIG. 7B). That is, the sense of the controlled variable (the controlled yaw moment) of the LDP control indicated by the phantom line is identical to that of the VDC control indicated by the solid line, and thus the higher one of the absolute value |MsV| of VDC desired yaw moment MsV and the absolute value |MsL| of LDP desired yaw moment MsL is determined as final desired yaw moment Ms by way of the select-HIGH process $Ms=\max(|MsV|, |MsL|)$ (see the expression (13) and step S10). Braking forces, that is, wheel-brake cylinder pressures for front and rear road wheels 5FL, 5FR, 5RL, and 5RR are controlled in a manner so as to achieve final desired yaw moment Ms, which is selected by the select-HIGH process $Ms=\max(|MsV|, |MsL|)$. In the vehicle dynamic behavior shown in FIG. 7B, when the host vehicle has a strong oversteer tendency, VDC desired yaw moment MsV corresponding to the controlled variable for VDC control is selected as final desired yaw moment Ms and therefore braking forces for front and rear road wheels 5FL, 5FR, 5RL, and 5RR are controlled in a manner so as to achieve VDC desired yaw moment MsV selected by the select-HIGH process, and additionally the engine torque output can be reduced by the braking torque created and actively controlled, thus reducing the host vehicle's speed. Therefore, the strong oversteer tendency can be effectively suppressed. At this time, the yaw moment, which is greater than LDP desired yaw moment MsL, can be produced, because of $Ms=\max(|MsV|, |MsL|)=|MsV| (\geq MsL)$, and whereby the host vehicle's lane deviation tendency can be adequately prevented. Additionally, the select-HIGH process $Ms=\max(|MsV|, |MsL|)=|MsV|$ effectively prevents over-control, thus permitting a proper magnitude of yaw moment to be actively exerted on the host vehicle, while preventing excessive application of yawing moment to the host vehicle. As a consequence, the host vehicle's oversteer tendency and lane deviation tendency can be both avoided. Conversely when the host vehicle's lane deviation tendency is stronger than the host vehicle's oversteer tendency, LDP desired yaw moment MsL corresponding to the controlled variable for LDP control is selected as final desired yaw moment Ms, and therefore braking forces for front and rear road wheels 5FL, 5FR, 5RL, and 5RR are controlled in a manner so as to achieve LDP desired yaw moment MsL, and additionally the engine torque output can be reduced by the braking torque created based on LDP desired yaw moment MsL. Thus, it is possible to effectively prevent the host vehicle's lane deviation by way of the LDP desired yaw moment MsL. At this time, the yaw moment, which is greater than VDC desired yaw moment MsV, can be produced, because of $Ms=\max(|MsV|, |MsL|)=|MsL|(\geq MsV)$, and whereby the oversteer tendency as well as the lane deviation tendency can be adequately avoided.

Figure 7C:
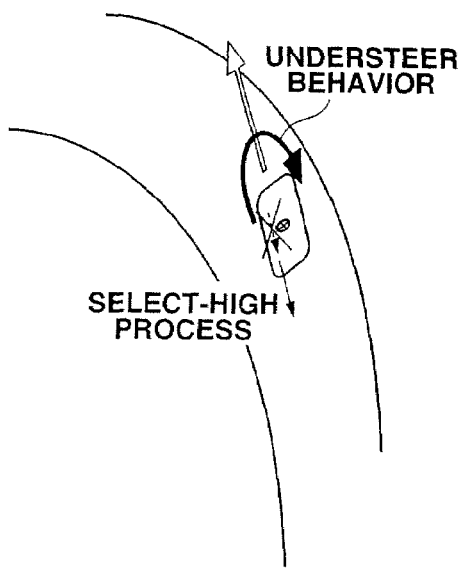

As shown in FIG. 7C, suppose that the host vehicle has an understeer tendency (an understeer behavior) during a left-hand turn and additionally the LDP control system determines that the host vehicle tends to deviate from the current driving lane toward the adjacent outside lane (to the right). As can be seen from the explanatory view of FIG. 7C, the direction of yaw-moment control of the LDP control system is an inward turning direction (see the arrow indicated by the phantom line in FIG. 7C), whereas the direction of yaw-moment control of the VDC control system is an understeer-avoidance direction, that is, an inward turning direction (see the arrow indicated by the solid line in FIG. 7C). That is, the sense of the controlled variable (the controlled yaw moment) of the LDP control indicated by the phantom line is identical to that of the VDC control indicated by the solid line, and thus the higher one of the absolute value |MsV| of VDC desired yaw moment MsV and the absolute value |MsL| of LDP desired yaw moment MsL is determined as final desired yaw moment Ms by way of the select-HIGH process $Ms=\max(|MsV|, |MsL|)$ (see the expression (13) and step S10). Braking forces, that is, wheel-brake cylinder pressures for front and rear road wheels 5FL, 5FR, 5RL, and 5RR are controlled in a manner so as to achieve final desired yaw moment Ms, which is selected by the select-HIGH process, and additionally the engine torque output can be reduced by the braking torque created and actively controlled. Thus, it is possible to adequately effectively suppress both of the host vehicle's understeer tendency and the lane deviation tendency.

Figure 7D:
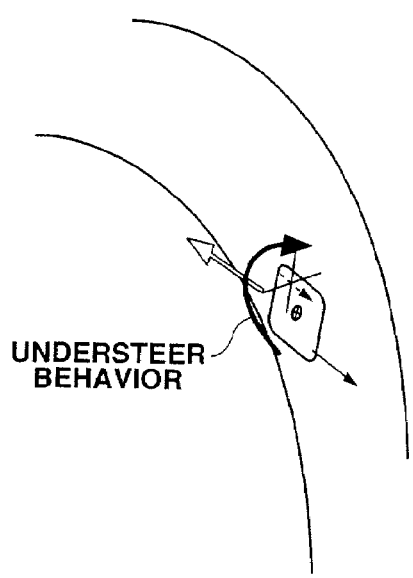

As shown in FIG. 7D, suppose that the host vehicle has an understeer tendency during a left-hand turn and additionally the LDP control system determines that the host vehicle tends to deviate from the current driving lane toward the adjacent inside lane (to the left). As can be seen from the explanatory view of FIG. 7D, the direction of yaw-moment control of the LDP control system is an outward turning direction (see the arrow indicated by the phantom line in FIG. 7D), whereas the direction of yaw-moment control of the VDC control system is an understeer-avoidance direction, that is, an inward turning direction (see the arrow indicated by the solid line in FIG. 7D). That is, the sense of the controlled variable (the controlled yaw moment) of the LDP control indicated by the phantom line is opposite to that of the VDC control indicated by the solid line, and thus a higher priority is put on the controlled variable (MsV) for VDC control rather than the controlled variable (MsL) for LDP control. Braking forces, that is, wheel-brake cylinder pressures for front and rear road wheels 5FL, 5FR, 5RL, and 5RR are controlled in a manner so as to achieve VDC desired yaw moment MsV. As result of this, the understeer tendency can be effectively adequately suppressed, and at the same time the host vehicle is decelerated by braking forces produced and actively controlled and also the engine torque output can be reduced by the braking torque created and actively controlled. Therefore, the host vehicle's lane deviation tendency cannot be adequately satisfactorily suppressed; however it is possible to reduce the degree of lane deviation.

As discussed above, even when the LDP control system and the VDC control system are simultaneously in operation, it is possible to avoid the LDP-VDC control interference that the controlled variable (MsL) for LDP control and the controlled variable (MsV) for VDC control cancel out each other, or to avoid over-control that an excessive controlled variable, in other words, an excessive change in vehicle dynamic behavior is produced. That is, the vehicle dynamics control apparatus of the embodiment capable of executing the routine of FIG. 2 can optimally realize the cooperative control between LDP control and VDC control.

In presence of a transition from the state where the LDP control system and the VDC control system are simultaneously in operation to a state where the absolute value |XS| of lane-deviation estimate XS becomes less than predetermined lane-deviation criterion $X_C$, lane-deviation decision flag $F_{LD}$ is set to "0" and thus LDP desired yaw moment MsL is set to "0". As a result, VDC desired yaw moment MsV is determined as final desired yaw moment Ms. Braking forces for front and rear road wheels 5FL, 5FR, 5RL, and 5RR are controlled in a manner so as to achieve final desired yaw moment Ms, which is set to VDC desired yaw moment MsV. From the point of time, a yaw moment needed to suppress oversteer or understeer tendencies is produced, and whereby it is possible to quickly stabilize the vehicle dynamic behavior.

On the contrary, in presence of a transition from the state where the LDP control system and the VDC control system are simultaneously in operation to a state where actual yaw rate φ' approaches adequately closer to final desired yaw rate φr', and also sideslip angle γ becomes less than or equal to predetermined sideslip-angle threshold value γth, VDC control indicative flag $F_{VDC}$ is reset (=0). As a result, VDC desired yaw moment MsV is set to "0", and thus LDP desired yaw moment MsL is determined as final desired yaw moment Ms. Braking forces for front and rear road wheels 5FL, 5FR, 5RL, and 5RR are controlled in a manner so as to achieve final desired yaw moment Ms, which is set to LDP desired yaw moment MsL. From this point of time, a yaw moment needed to prevent the host vehicle's lane deviation tendency is produced, and whereby it is possible to quickly prevent the host vehicle from deviating from the current driving lane.

Under this condition, if ECU 8 determines that there is no necessity for both of LDP control and VDC control, the controlled variable (MsL) for LDP control and the controlled variable (MsV) for VDC control are both set to "0". As a result, final desired yaw moment Ms is set to "0". Thus, there is no braking force created based on yaw moment control (LDP control and/or VDC control), and additionally there is no limitation to engine torque output, occurring due to the yaw moment control.

When direction indicator switch 20 is turned on by the driver for the purpose of lane changing or collision avoidance between the host vehicle and the frontally-located object or the preceding vehicle in a vehicle traveling state, and thereafter the vehicle is steered manually, the signs of direction indicator switch signal WS and lane-deviation estimate XS (i.e., the steered direction based on steer angle δ) are identical to each other. Therefore, the processor of ECU 8 determines that the host vehicle is conditioned in the lane changing state with the driver's intention for lane changing and thus lane-changing indicative flag $F_{LC}$ is set to "1". Under the condition of $F_{LC}=1$, lane-deviation decision flag $F_{LD}$ is forcibly reset to "0" even when lane-deviation decision flag $F_{LD}$ becomes set to "+1" or "−1" or even when the absolute value |XS| of lane-deviation estimate XS becomes greater than or equal to predetermined lane-deviation criterion $X_C$. Therefore, when the host vehicle tends to deviate from the current driving lane with driver's intention for lane changing, LDP control can be inhibited.

As previously discussed in detail in reference to FIGS. 7A-7D, the operation and effects of the vehicle dynamics control apparatus of the embodiment is exemplified under four different vehicle dynamic behaviors during a left-hand turn. It will be appreciated that, according to the vehicle dynamics control apparatus of the embodiment, the same operation and effects can be ensured under the other vehicle dynamic behaviors, such as during a right-hand turn or during a straight-ahead driving.

In the vehicle dynamics control apparatus of the embodiment executing the control routine of FIG. 2, the arithmetic and/or logic operations of steps S1-S8 serve as a lane deviation prevention (LDP) means. The process of step S9 serves as a vehicle dynamics stability control (VDC) means or a vehicle driving stability control means. The processes of steps S10-S13 serve as a cooperative control means. Of steps S10-S13 included in the cooperative control means, a part of the process of step S10, needed to determine whether the host vehicle deviates from the current driving lane to an outward turning direction or to an inward turning direction, serves as a vehicle driving state detection means. The other part of the process of step S10, needed to calculate final desired yaw moment Ms, serves as a cooperative-control controlled variable calculation means. The process of step S11 serves as a braking/driving force distribution means through which braking/driving force distribution among road wheels is determined. CCD camera 13, camera controller 14, yaw rate sensor 16, and wheel speed sensors 22FL, 22FR, 22RL, and 22RR serve as a host-vehicle driving data detection means.

Figure 8:
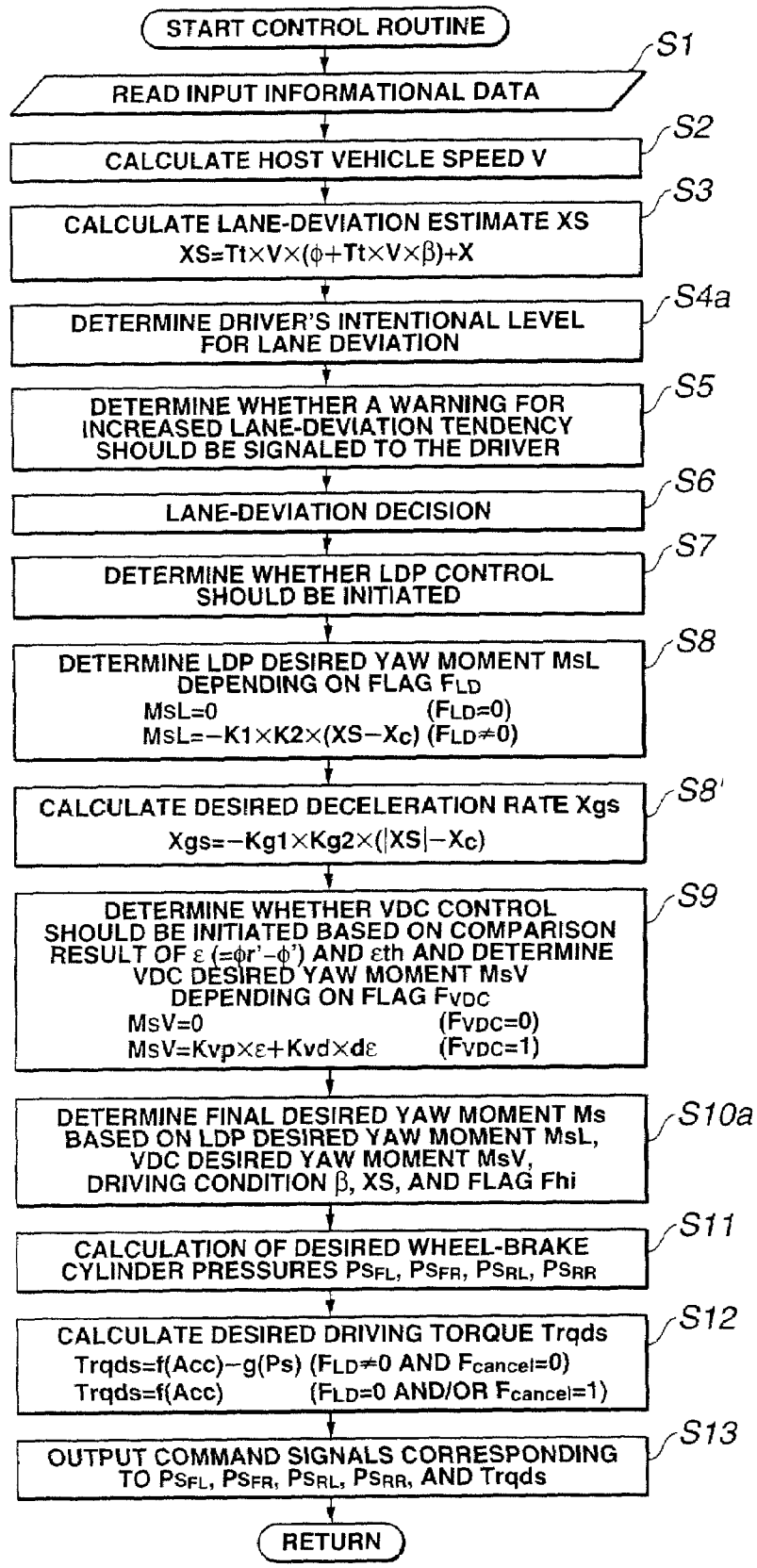
FIG. 8 is a flow chart showing a first modified control routine (first modified arithmetic and logic operations) executed within the braking/driving force control unit incorporated in the vehicle dynamics control apparatus of the embodiment.

Referring now to FIG. 8, there is shown the first modified control routine, which is somewhat modified from the control routine shown in FIG. 2. The first modified control routine shown in FIG. 8 is also executed as time-triggered interrupt routines to be triggered every predetermined sampling time intervals such as 10 milliseconds. The first modified control routine of FIG. 8 is similar to the control routine of FIG. 2, except that steps S4 and S10 included in the routine shown in FIG. 2 are replaced with steps S4a and S10a included in the first modified routine shown in FIG. 8, and also step S8' is further added within the first modified routine of FIG. 8. Thus, the same step numbers used to designate steps in the routine shown in FIG. 2 will be applied to the corresponding step numbers used in the first modified control routine shown in FIG. 8, for the purpose of comparison of the two different interrupt routines. Steps S4a, S8' and S10a will be hereinafter described in detail with reference to the accompanying drawings, while detailed description of steps S1-S3, S5-S9, S11-S13 will be omitted because the above description thereon seems to be self-explanatory.

According to the first modified control routine of FIG. 8, input informational data from the engine/vehicle switches and sensors, and driving-torque controller 12 and camera controller 14 are read through step S1, host vehicle speed V is calculated through step S2, and then lane-deviation estimate XS is calculated from the expression XS=Tt×V×(φ+Tt×V×β)+X through step S3. Thereafter, step S4a occurs.

At step S4a, a check is made to determine, based on a manipulated variable of the driver, concretely a steering torque Tstr, accelerator opening Acc, and/or master-cylinder pressure Pm, whether or not a level of the driver's intention for lane deviation is high. When at least one of steering torque Tstr, accelerator opening Acc, and master-cylinder pressure Pm is greater than or equal to its threshold value, the processor of ECU 8 determines that the driver executes intentionally lane-deviation operation and thus the level of the driver's intention for lane deviation is high. In such a case, an intentional level high flag Fhi is set to "1". Conversely when steering torque Tstr, accelerator opening Acc, and master-cylinder pressure Pm are all less than their threshold values, the processor of ECU 8 determines that the level of the driver's intention for lane deviation is not high, and thus intentional level high flag Fhi is reset to "0". For instance, the magnitude of steering torque Tstr manually acting on the steering wheel may be detected directly by means of a torque sensor (not shown) attached to the steering mechanism. The threshold values for steering torque Tstr, accelerator opening Acc, and master-cylinder pressure Pm may be determined as predetermined fixed values. In lieu thereof, these threshold values may be determined as variables that vary depending on host vehicle speed V. The previously-discussed the driver's intentional level determination (i.e., setting or resetting of intentional level high flag Fhi) for lane deviation can also be applied to the driver's intentional lane-changing determination (i.e., setting or resetting of lane-changing indicative flag $F_{LC}$, in other words, the presence or absence of the driver's intention for lane-changing). For instance, when intentional level high flag Fhi is set (Fhi=1) or direction indicator switch 20 is turned on, lane-changing indicative flag $F_{LC}$ may be set to "1". Conversely when intentional level high flag Fhi is reset (Fhi=0) and direction indicator switch 20 is turned off, lane-changing indicative flag $F_{LC}$ may be reset to "0".

Thereafter, at step S5, ECU 8 determines, based on a comparison result of lane-deviation estimate absolute value |XS| and predetermined alarm criterion $X_W$, whether a visual and/or audible warning for the increased host vehicle's lane-deviation tendency should be signaled to the driver. Then, at step S6, ECU 8 determines, based on a comparison result of lane-deviation estimate XS and predetermined lane-deviation criterion $X_C$, whether there is an increased tendency for the host vehicle to deviate from the current driving lane. Additionally, through step S6, when intentional level high flag Fhi is reset (Fhi=0) and lane-deviation estimate absolute value |XS| is greater than or equal to predetermined lane-deviation criterion $X_C$, lane-deviation decision flag $F_{LD}$ is set to "1". Thereafter, at step S7, ECU 8 determines, based on a comparison result of the rate of fluctuation in lane-deviation estimate XS (that is, $|XS_{(n-1)}-XS_{(n)}|$) and predetermined threshold value $L_{XS}$, whether the LDP control should be initiated. In case of $|XS_{(n-1)}-XS_{(n)}|<L_{XS}$, ECU 8 determines that lane-deviation estimate XS is continuous, and thus LDP control inhibiting flag $F_{cancel}$ is reset to "0". After this, the control routine proceeds from step S7 to step S8, desired yaw moment MsL for LDP control, that is, LDP desired yaw moment is arithmetically calculated based on lane-deviation estimate XS and predetermined lane-deviation criterion $X_C$. After step S8, step S8' occurs.

At step S8', a desired deceleration rate Xgs for vehicle deceleration control, which is achieved by way of LDP control, is arithmetically calculated under a condition where the LDP control system and the VDC control system simultaneously come into operation and then priority has been given to the VDC control. More concretely, when the state of lane-deviation decision flag $F_{LD}$ is determined as $F_{LD}\neq0$ through step S6, the state of LDP control inhibiting flag $F_{cancel}$ is determined as $F_{cancel}=0$ through step S7 and thus the conditions defined by $F_{LD}\neq0$ and $F_{cancel}=0$ are simultaneously satisfied, desired deceleration rate Xgs is calculated from the following expression (22). Conversely when the condition defined by $F_{LD}\neq0$ is unsatisfied or the condition defined by $F_{cancel}=0$ is unsatisfied, desired deceleration rate Xgs is determined as "0".

$$Xgs=-Kg1\times Kg2\times(|XS|-X_C) \tag{22}$$

where Kg1 denotes a predetermined constant that is determined by specifications of the host vehicle, and Kg2 denotes a proportional gain or a variable gain that varies depending on host vehicle speed V.

Figure 9:
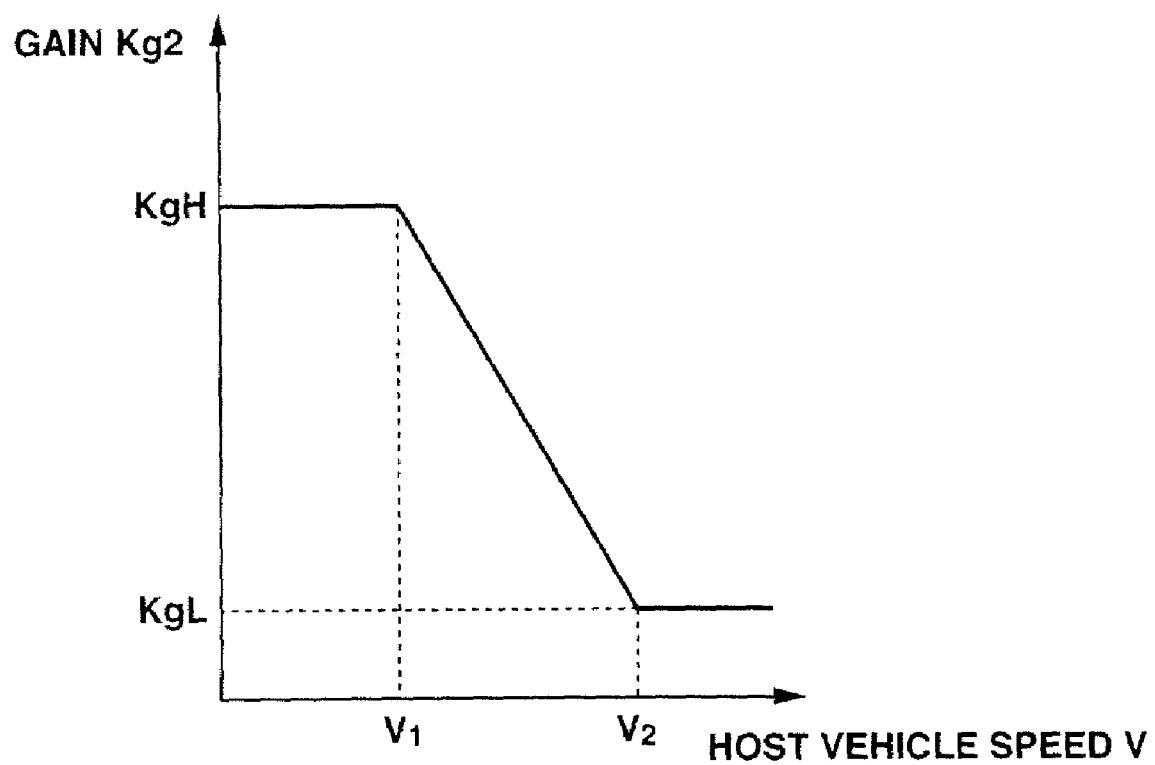
FIG. 9 is a predetermined host vehicle's speed V versus gain Kg2 characteristic map.

Gain Kg2 is calculated or retrieved from the preprogrammed vehicle-speed V versus gain Kg2 characteristic map of FIG. 9 showing how a gain Kg2 has to be varied relative to a host vehicle's speed V. As can be appreciated from the preprogrammed characteristic map of FIG. 9, in a low speed range $(0\leq V\leq V_1)$ from 0 to a predetermined low speed value $V_1$, gain Kg2 is fixed to a predetermined relatively high gain $Kg_H$. In a middle and high speed range $(V_1<V<V_2)$ from the predetermined low speed value $V_1$ to a predetermined high speed value $V_2$ (higher than $V_1$), gain Kg2 gradually reduces to a predetermined relatively low gain $Kg_L$, as the host vehicle's speed V increases. In an excessively high speed range $(V_2<V)$ above predetermined high speed value $V_2$, gain Kg2 is fixed to predetermined relatively low gain $Kg_L$.

Thereafter, at step S9, VDC desired yaw moment MsV, corresponding to the controlled variable for VDC control, is arithmetically calculated based on a yaw-rate deviation (=φr'-φ') between a final desired yaw rate φr' and actual yaw rate φ' detected by yaw rate sensor 16 and resulting from the yaw moment acting on the host vehicle, and a sideslip angle γ (described later). After step S9, step S10a occurs.

At step S10a, final desired yaw moment Ms is calculated or determined based on LDP desired yaw moment MsL (calculated through step S8) corresponding to the controlled variable for LDP control, VDC desired yaw moment MsV (calculated through step S9) corresponding to the controlled variable for VDC control, the driving condition determined based on sensor signals from the engine/vehicle sensors, and intentional level high flag Fhi representing whether the level of the driver's intention for lane deviation is high (Fhi=1) or low (Fhi=0). The driving condition is used to estimate or determine whether the host vehicle tends to deviate from the current driving lane toward the inside lane or toward the outside lane during turns. Concretely, the driving condition is determined based on curvature β of the current driving lane and lane-deviation estimate XS. When the direction of yawing motion created by VDC control (that is, the sign of VDC desired yaw moment MsV) is opposite to the direction of yawing motion created by LDP control (that is, the sign of LDP desired yaw moment MsL) and additionally the LDP control system, based on the detected driving condition, determines that the host vehicle tends to deviate from the current driving lane toward the adjacent outside lane, that is to say, when the host vehicle tends to deviate from the current driving lane to the left during a right-hand turn or when the host vehicle tends to deviate from the current driving lane to the right during a left-hand turn, a higher priority is put on VDC control rather than LDP control and thus VDC desired yaw moment MsV, corresponding to the controlled variable for VDC control, is determined as final desired yaw moment Ms. At the same time, ECU 8 determines that vehicle deceleration control should be executed by way of LDP control, when the host vehicle tends to deviate from the current driving lane toward the adjacent outside lane during a turn.

On the contrary, when the direction of yawing motion created by VDC control (that is, the sign of VDC desired yaw moment MsV) is opposite to the direction of yawing motion created by LDP control (that is, the sign of LDP desired yaw moment MsL) and additionally the LDP control system determines that the host vehicle tends to deviate from the current driving lane toward the adjacent inside lane, that is to say, when the host vehicle tends to deviate from the current driving lane to the right during a right-hand turn or when the host vehicle tends to deviate from the current driving lane to the left during a left-hand turn, ECU 8 further takes into account the state of intentional level high flag Fhi indicative of the level of the driver's intention for lane deviation, and determines, based on intentional level high flag Fhi set or reset through step S4a, whether a higher priority should be put on VDC control or LDP control. When intentional level high flag Fhi is set to "1", i.e., Fhi=1, ECU 8 determines that the host vehicle tends to deviate from the current driving lane with the driver's intention for lane changing. In case of Fhi=1, priority is given to VDC control rather than LDP control, and therefore VDC desired yaw moment MsV, corresponding to the controlled variable for VDC control, is set to final desired yaw moment Ms. Conversely when intentional level high flag Fhi is reset to "0", i.e., Fhi=0, priority is given to LDP control rather than VDC control, and therefore LDP desired yaw moment MsL, corresponding to the controlled variable for LDP control, is set to final desired yaw moment Ms. As discussed above, in case of Fhi=0, priority is given to LDP control and therefore ECU 8 determines that it is unnecessary to execute vehicle deceleration control by way of the LDP control system and thus desired deceleration rate Xgs for vehicle deceleration control is set to "0", i.e., Xgs=0.

In contrast to the above, when the direction of yawing motion created by VDC control (that is, the sign of VDC desired yaw moment MsV) is identical to the direction of yawing motion created by LDP control (that is, the sign of LDP desired yaw moment MsL), the higher one of the absolute value |MsV| of VDC desired yaw moment MsV and the absolute value |MsL| of LDP desired yaw moment MsL is set or determined as final desired yaw moment Ms by way of the select-HIGH process defined by Ms=max (|MsV|, |MsL|). When the absolute value |MsL| of LDP desired yaw moment MsL is higher than the absolute value |MsV| of VDC desired yaw moment MsV and therefore the absolute value |MsL| of LDP desired yaw moment MsL is determined as final desired yaw moment Ms and a higher priority is put on LDP control rather than VDC control, ECU 8 determines that it is unnecessary to execute vehicle deceleration control by way of LDP control and thus desired deceleration rate Xgs is set to "0". Conversely when the absolute value |MsV| of VDC desired yaw moment MsV is determined as final desired yaw moment Ms and a higher priority is put on VDC control rather than LDP control, ECU 8 determines that it is unnecessary to execute vehicle deceleration control by way of LDP control since it is possible to suppress the host vehicle from deviating from the current driving lane by executing the VDC control. Thus, desired deceleration rate Xgs is set to "0". In this manner, final desired yaw moment Ms has been determined through step S10a, and thereafter step S11 occurs. At step S11, desired wheel-brake cylinder pressures $Ps_{FL}$, $Ps_{FR}$, $Ps_{RL}$ and $Ps_{RR}$ are calculated based on master cylinder pressure Pm read through step S1 and final desired yaw moment Ms determined through step S10a.

That is, in case of $F_{LD}$=0 or $F_{cancel}$=1 and $F_{VDC}$=0, front-left and front-right desired wheel-brake cylinder pressures $Ps_{FL}$ and $Ps_{FR}$ are set to master-cylinder pressure Pm (see the following expressions), whereas rear-left and rear-right desired wheel-brake cylinder pressures $Ps_{RL}$ and $Ps_{RR}$ are set to a rear-wheel master-cylinder pressure Pmr (see the following expressions).

$Ps_{FL}$=Pm $Ps_{FR}$=Pm $Ps_{RL}$=Pmr $Ps_{RR}$=Pmr

In contrast to the above, during operation of the VDC system ($F_{VDC}$0), exactly when the condition defined by $F_{LD}$=0 or $F_{cancel}$=1 and $F_{VDC}$=0 is unsatisfied, each of desired front and rear wheel-brake cylinder pressures $Ps_{FL}$, $Ps_{FR}$, $Ps_{RL}$ and $Ps_{RR}$ is calculated based on the magnitude of final desired yaw moment Ms determined through step S10a. Concretely, when the absolute value |Ms| of final desired yaw moment Ms determined through step S10a is less than predetermined desired yaw-moment threshold value Msth, (i.e., |Ms|<Msth), the processor of ECU 8 determines each of desired wheel-brake cylinder pressures $Ps_{FL}$ through $Ps_{RR}$ in such a manner as to provide only the differential pressure between rear road wheels 5RL and 5RR. In other words, the differential pressure between front road wheels 5FL and 5FR is set to "0". Thus, in case of |Ms|<Msth, the front desired wheel-brake cylinder pressure difference $\Delta Ps_F$, and the rear desired wheel-brake cylinder pressure difference $\Delta Ps_R$ are calculated from the expressions $\Delta Ps_F$=0 and $\Delta Ps_R$=2×$Kb_R$×|Ms|/T (see the expression (16)).

Conversely when the absolute value |Ms| of final desired yaw moment Ms determined through step S10a is greater than or equal to the predetermined threshold value Msth, (i.e., |Ms|≧Msth), the processor of ECU 8 determines each of desired wheel-brake cylinder pressures $Ps_{FL}$ through $Ps_{RR}$ in such a manner as to provide both of the differential pressure between front road wheels 5FL and 5FR and the differential pressure between rear road wheels 5RL and 5RR. In this case, front and rear desired wheel-brake cylinder pressure differences $\Delta Ps_F$ and $\Delta Ps_R$ are represented by the expressions $\Delta Ps_F = 2 \times Kb_F \times (|Ms| - Msth)/T$ and $\Delta Ps_R = 2 \times Kb_R \times Msth/T$ (see the expressions (17) and (18)).

In setting front and rear desired wheel-brake cylinder pressure differences $\Delta Ps_F$ and $\Delta Ps_R$ in case of $|Ms| \geq Msth$, the system executing the control routine of FIG. 8 actually determines both of the front and rear desired brake fluid pressure differences $\Delta Ps_F$ and $\Delta Ps_R$ based on the above expressions (17) and (18). Instead of producing the desired yaw-moment controlled variable needed for VDC control or LDP control by creating both of the front and rear desired brake fluid pressure differences $\Delta Ps_F$ and $\Delta Ps_R$, the desired yaw moment may be produced by only the front desired wheel-brake cylinder pressure difference $\Delta Ps_F$. In such a case, front and rear desired wheel-brake cylinder pressure differences $\Delta Ps_F$ and $\Delta Ps_R$ are obtained from the expressions $\Delta Ps_R = 0$ and $\Delta Ps_F = 2 \cdot Kb_F \cdot |Ms|/T$ (see the expression (19)). In this manner, front and rear desired wheel-brake cylinder pressure differences $\Delta Ps_F$ and $\Delta Ps_R$ has been calculated. Thereafter, a controlled fluid pressure Pxgs is arithmetically calculated based on desired deceleration rate Xgs, which is calculated through step S8' to achieve vehicle deceleration control by way of LDP control, from the following expression (23).

$$Pxgs = Kxgs \times Xgs \quad (23)$$

where Kxgs denotes a predetermined constant that is determined by specifications of the host vehicle.

After this, desired wheel-brake cylinder pressures $Ps_{FL}$, $Ps_{FR}$, $Ps_{RL}$ and $Ps_{RR}$ are calculated based on front and rear desired wheel-brake cylinder pressure differences $\Delta Ps_F$ and $\Delta Ps_R$, and master cylinder pressure Pm as follows.

At this time, when final desired yaw moment Ms determined through step S10a is a negative value (Ms<0), in other words, the host vehicle tends to deviate from the current driving lane to the left, in order to produce the component of yaw moment vector needed to rotate the host vehicle to the right, desired wheel-brake cylinder pressures $Ps_{FL}$, $Ps_{FR}$, $Ps_{RL}$ and $Ps_{RR}$ are determined and calculated from the following expression (24).

$$Ps_{FL} = Pm + Pxgs$$

$$Ps_{FR} = Pm + Pxgs + \Delta Ps_F$$

$$Ps_{RL} = Pmr + Pxgs$$

$$Ps_{RR} = Pmr + Pxgs + \Delta Ps_R \quad (24)$$

On the contrary, when final desired yaw moment Ms determined through step S10a is a positive value (Ms≧0), in other words, the host vehicle tends to deviate from the current driving lane to the right, in order to produce the component of yaw moment vector needed to rotate the host vehicle to the left, desired wheel-brake cylinder pressures $Ps_{FL}$, $Ps_{FR}$, $Ps_{RL}$ and $Ps_{RR}$ are determined and calculated from the following expression (25).

$$Ps_{FL} = Pm + Pxgs + \Delta Ps_F$$

$$Ps_{FR} = Pm + Pxgs$$

$$Ps_{RL} = Pmr + Pxgs + \Delta Ps_R$$

$$Ps_{RR} = Pmr + Pxgs \quad (25)$$

Thereafter, through step S12, desired driving torque Trqds is arithmetically calculated in the same manner as previously described. Concretely, in case of $F_{LD} \neq 0$ and $F_{cancel} = 0$, desired driving torque Trqds is calculated from the expression Trqds=f(Acc)−g(Ps). Thus, the engine torque output can be reduced by the braking torque created based on the function g(Ps) corresponding to a desired braking torque that is determined based on the summed desired wheel-brake cylinder pressure differences Ps ($=\Delta Ps_F + \Delta Ps_R$). After this, through step S13, command signals corresponding to desired wheel-brake cylinder pressures $Ps_{FL}$, $Ps_{FR}$, $Ps_{RL}$, and $Ps_{RR}$, calculated through step S11, are output from the input interface of ECU 8 to hydraulic modulator 7, and at the same time a command signal corresponding to desired driving torque Trqds, calculated through step S12, is output from the output interface of ECU 8 to driving torque control unit 12. In this manner, one cycle of the time-triggered interrupt routine (the yaw moment control routine shown in FIG. 8) terminates and the predetermined main program is returned.

The vehicle dynamics control apparatus executing the first modified control routine of FIG. 8 can provide the same operation and effects as the embodiment shown in FIG. 2. That is, even when the LDP control system and the VDC control system are simultaneously in operation, it is possible to avoid the LDP-VDC control interference that the controlled variable (MsL) for LDP control and the controlled variable (MsV) for VDC control cancel out each other, or to avoid over-control that an excessive controlled variable, in other words, an excessive change in vehicle dynamic behavior is produced. The vehicle dynamics control apparatus of the embodiment capable of executing the first modified routine of FIG. 8 can optimally realize the cooperative control between LDP control and VDC control.

Details of the operation of the vehicle dynamics control apparatus capable of executing the first modified routine of FIG. 8 are hereunder described by reference to FIGS. 10A-10D.

Figure 10A:
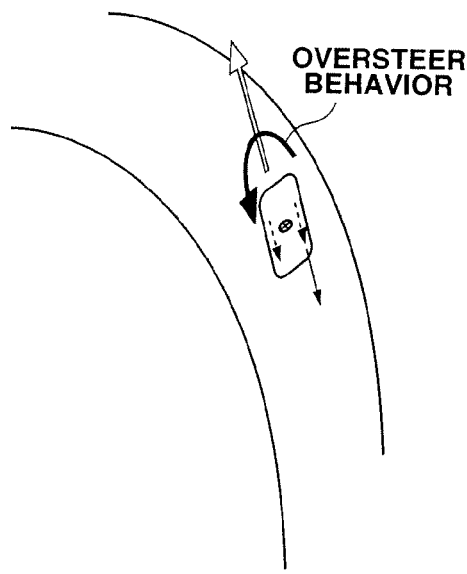
FIGS. 10A-10D are explanatory views showing control actions performed by the apparatus of the embodiment executing the first modified control routine shown in FIG. 8 and enabling cooperative control between LDP control and VDC control, under four different vehicle dynamic behaviors.

Suppose that the host vehicle tends to deviate from the current driving lane toward the adjacent outside lane and additionally the direction of yawing motion created by VDC control (that is, the sign of VDC desired yaw moment MsV) is opposite to the direction of yawing motion created by LDP control (that is, the sign of LDP desired yaw moment MsL). As can be seen from the explanatory view of FIG. 10A showing one example of vehicle dynamic behavior where the host vehicle has an oversteer behavior during a left-hand turn and the host vehicle tends to deviate from the current driving lane toward the adjacent outside lane (to the right), according to the apparatus capable of executing the first modified routine of FIG. 8, the integrated yawing motion control apparatus (containing VDC control system and LDP control system) operates that a higher priority is put on VDC control rather than LDP control, and additionally a braking force, which is determined based on the difference ($|Xs| - X_C$) between the absolute value $|XS|$ of lane-deviation estimate XS and predetermined lane-deviation criterion $X_C$, is produced and exerted on the host vehicle by way of vehicle deceleration control executed by the LDP control system (see the arrows indicated by the phantom lines in FIG. 10A). Therefore, priority is given to VDC control (see VDC desired yaw moment MsV, corresponding to the controlled variable for VDC control, indicated by the solid line in FIG. 10A). By virtue of application of VDC desired yaw moment MsV, as indicated by the solid line in FIG. 10A, to the host vehicle, it is possible to effectively satisfactorily control undesired vehicle behavior (undesired oversteer or understeer tendencies) toward the neutral steer, thus enhancing the vehicle stability. In addition to the above, as indicated by the phantom lines in FIG. 10A, the braking force, based on the difference ($|XS| - X_C$), is simultaneously produced to achieve vehicle deceleration control and to prevent lane deviation. Therefore, the apparatus executing the first modified routine of FIG. 8 can continuously achieve the additional effect (lane deviation prevention), while putting a higher priority on VDC control rather than LDP control, thus effectively reducing or suppressing the degree of the host vehicle's lane deviation from the driving lane.

Figure 10B:
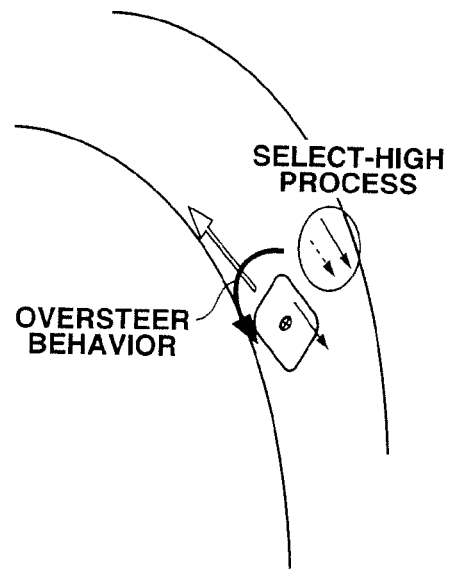
Figure 10C:
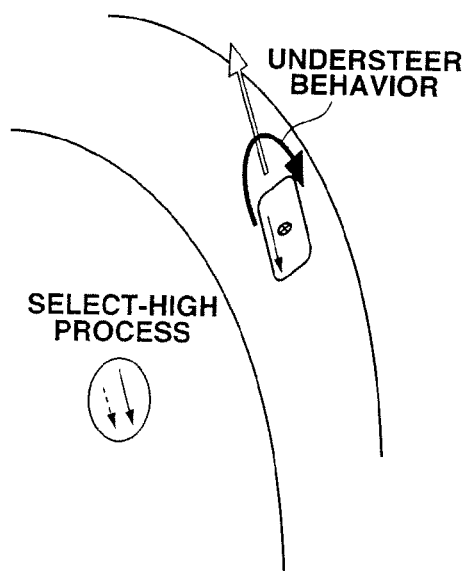

The control actions shown in FIGS. 10B and 10C, achieved by the apparatus capable of executing the first modified routine of FIG. 8 are equal to those shown in FIGS. 7B and 7C, achieved by the apparatus capable of executing the control routine of FIG. 2.

Figure 10D:
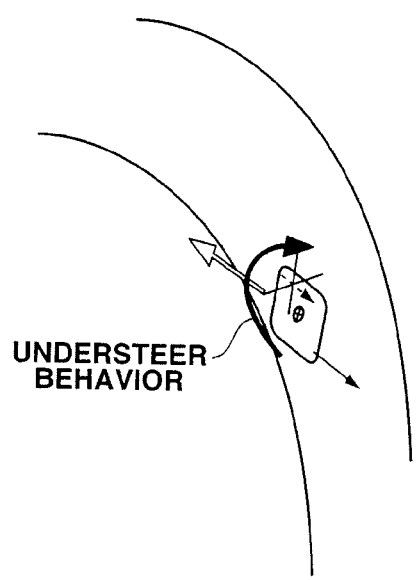

Suppose that the host vehicle tends to deviate from the current driving lane toward the adjacent inside lane and additionally the direction of yawing motion created by VDC control (that is, the sign of VDC desired yaw moment MsV) is opposite to the direction of yawing motion created by LDP control (that is, the sign of LDP desired yaw moment MsL). As can be seen from the explanatory view of FIG. 10D showing one example of vehicle dynamic behavior where the host vehicle has an understeer tendency during a left-hand turn and the host vehicle tends to deviate from the current driving lane toward the adjacent inside lane (to the left), the integrated yawing motion control apparatus (containing VDC control system and LDP control system) operates to determine, based on a manipulated variable of the driver, such as steering torque Tstr, accelerator opening Acc, and/or master-cylinder pressure Pm, whether or not a level of the driver's intention for lane deviation is high. When intentional level high flag Fhi is set (Fhi=1), that is, the host vehicle tends to deviate from the current driving lane with the driver's intention for lane changing, a higher priority is put on VDC control rather than LDP control. Conversely when the level of the driver's intention for lane deviation is low and thus intentional level high flag Fhi is reset (Fhi=0), but the host vehicle tends to deviate from the current driving lane, a higher priority is put on LDP control rather than VDC control. As shown in FIG. 10D, when the level of the driver's intention for lane deviation is high, that is, Fhi=1 under the condition where the host vehicle has an understeer behavior during a left-hand turn and additionally the host vehicle tends to deviate from the current driving lane toward the adjacent inside lane (to the left), priority is given to VDC control, thereby ensuring the enhanced vehicle driveability or maneuverability (in other words, easy change of vehicle heading or easy turning) rather than the vehicle stability, and whereby the dynamic behavior of the host vehicle can be easily intentionally handled by the driver. On the contrary, when the level of the driver's intention for lane deviation is low, that is, Fhi=0 and the host vehicle tends to deviate from the current driving lane toward the adjacent inside lane (to the left) with no driver's intention for lane changing under the condition where the host vehicle has an understeer behavior during a left-hand turn, priority is given to LDP control, thereby effectively avoiding unintentional lane deviation.

Figure 11:
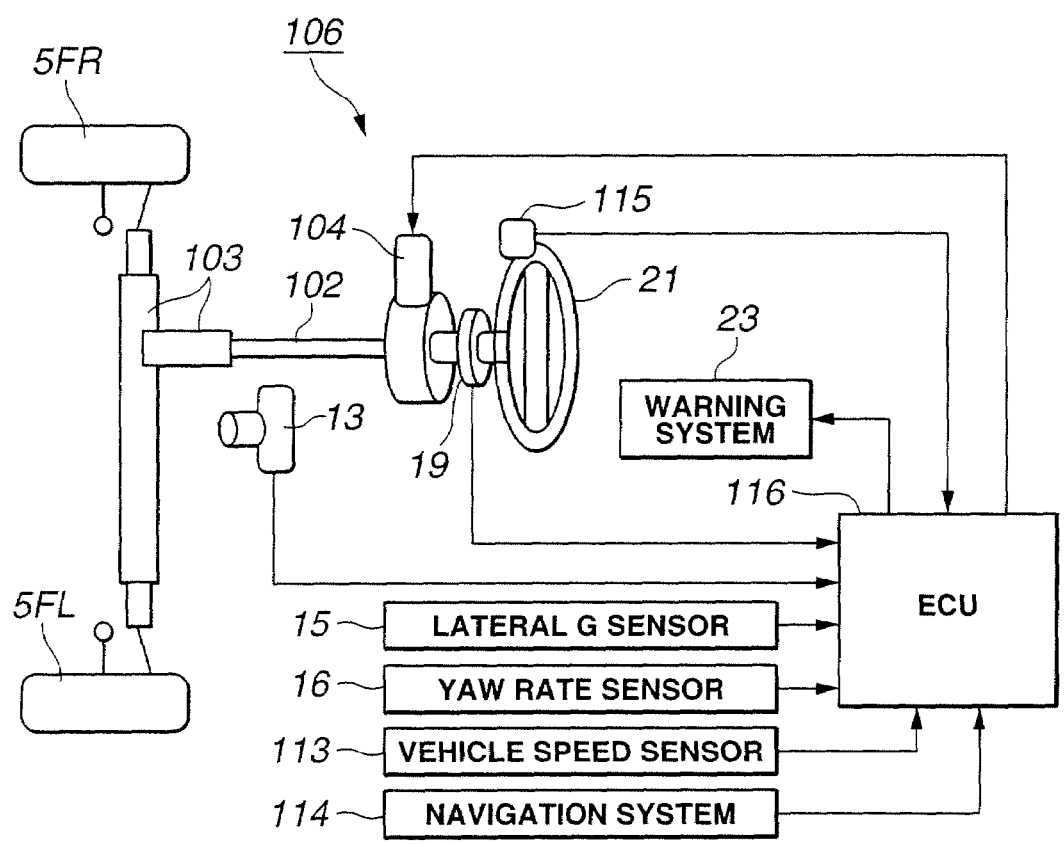
FIG. 11 is a system block diagram illustrating a modification of a vehicle dynamics control apparatus enabling a VDC function and an LDP function.

In the shown embodiment, when at least one of steering torque Tstr, accelerator opening Acc, and master-cylinder pressure Pm is greater than or equal to its threshold value, the level of the driver's intention for lane deviation is high and then intentional level high flag Fhi is set to "1". Instead of using a comparison result between each of steering torque Tstr, accelerator opening Acc, and master-cylinder pressure Pm and its threshold value, the level of the driver's intention for lane deviation may be determined based on a time rate of change in the driver's manipulated variable (Tstr, Acc, Pm). Alternatively, the level of the driver's intention for lane deviation may be determined based on the other driver's manipulated variable, such as a steering wheel rotation angle or an amount of brake-pedal depression, or a time rate of change in the steering wheel rotation angle or a time rate of change in the brake-pedal depression amount. Alternatively, a decision for inattentive driving or the state that the driver has fallen asleep may be made by image-processing the image data from a driver image-processing device (or a driver image-processing means) such as a CCD camera. The level of the driver's intention for lane deviation may be determined based on the image data from the driver image-processing device. By using the driver image-processing means such as a CCD camera, it is possible to more quickly continuously detect whether the level of the driver's intention for lane deviation is low or high. In such a case, in addition to CCD camera 13 (as shown in FIGS. 1 and 11) serving as an external recognizing sensor that provides an image-processing image data in front of the host vehicle, an additional CCD camera 13, serving as the driver image-processing means, has to be added. In case that ECU 8 determines, based on the image data from the image-processing means such as a CCD camera, that the level of the driver's intention for lane deviation is low, it is possible more quickly to place a higher priority on LDP control, thus more quickly effectively reducing or suppressing the degree of the host vehicle's lane deviation from the driving lane.

In lieu thereof, the manipulated variable of the driver, such as steering torque Tstr, accelerator opening Acc, and/or master-cylinder pressure Pm, and the image data from the image-processing means (CCD camera 13) may be used to determine the level of the driver's intention for lane deviation.

In the shown embodiment, ECU 8 determines, based on the level of the driver's intention for lane deviation, whether a higher priority should be put on VDC control or LDP control. Alternatively, when ECU 8 determines that the level of the driver's intention for lane deviation is low (Fhi=0), LDP desired yaw moment MsL corresponding to the controlled variable for LDP control may be adjusted properly.

In the vehicle dynamics control apparatus (the integrated yawing-motion control apparatus) executing the first modified control routine of FIG. 8, hydraulic modulator 7 serves as a braking force generating means. The process of step S4$a$ of FIG. 8 serves as a driver's intentional level detection means for determining the level of the driver's intention for lane deviation. A part of the process of step S4$a$, needed to detect steering torque Tstr, accelerator opening Acc, and/or master-cylinder pressure Pm as a manipulated variable of the driver, serves as a manipulated variable detection means.

Figure 12:
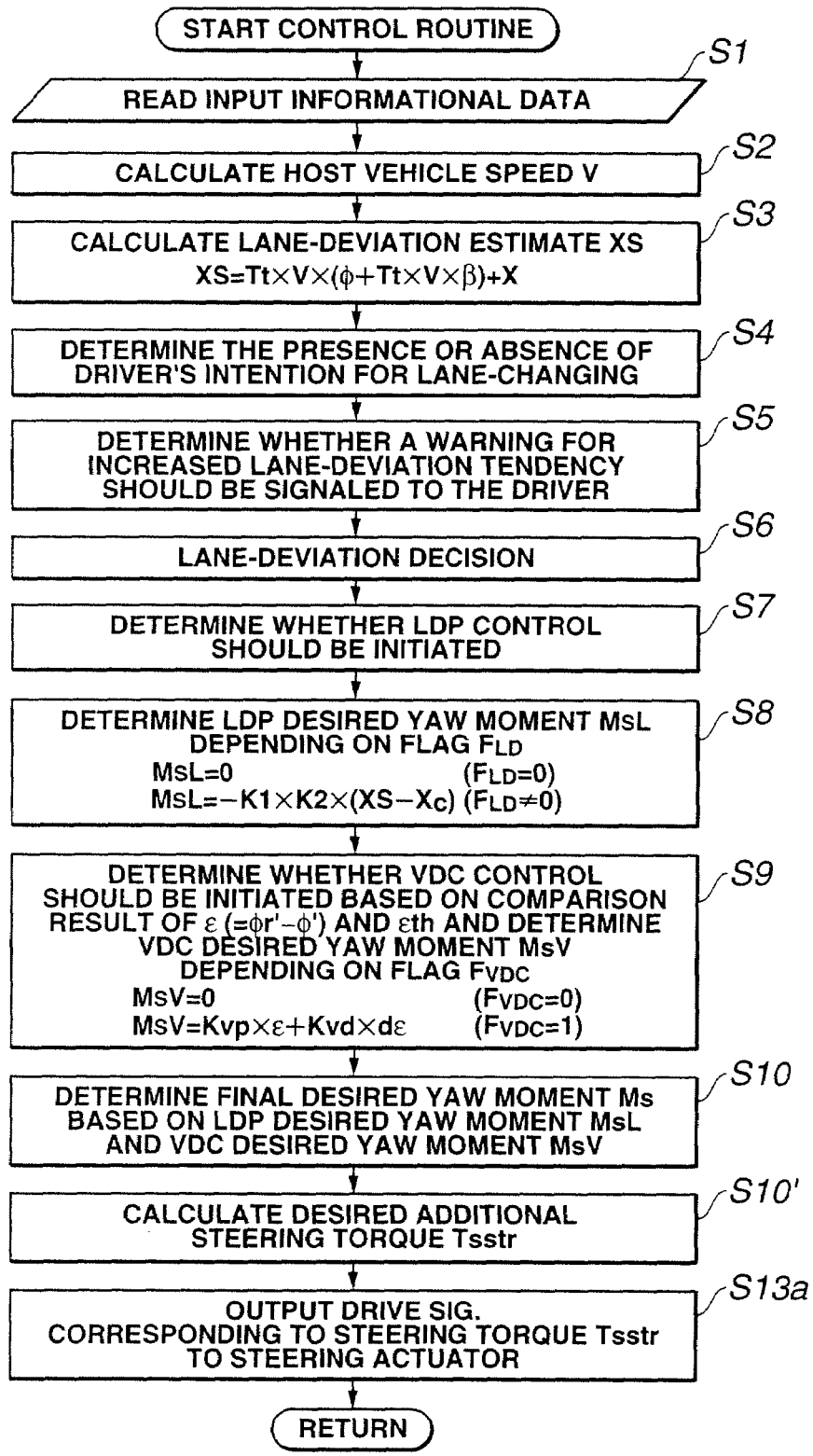
FIG. 12 is a flow chart showing a second modified control routine (second modified arithmetic and logic operations) executed within the braking/driving force control unit incorporated in the vehicle dynamics control apparatus of the embodiment.

Referring now to FIG. 11, there is shown the modified vehicle dynamics control apparatus (or the modified integrated yawing motion control apparatus) 106 enabling cooperative control between VDC control and LDP control. In FIG. 11, for the purpose of simplification of the disclosure, the same reference signs used to designate elements in the embodiment shown in FIGS. 1 and 2 will be applied to the corresponding elements used in the modified vehicle dynamics control apparatus of FIG. 11, while detailed description of the same reference signs will be omitted because the above description thereon seems to be self-explanatory. In FIG. 11, reference sign 102 denotes a steering shaft, reference sign 103 denotes a steering gear, reference sign 104 denotes an electronically-controlled steering actuator, reference sign 113 denotes a vehicle speed sensor, reference sign 114 denotes a navigation system, reference sign 115 denotes a steering wheel rotation angle sensor, and 116 denotes an electronic control unit (ECU). Steering wheel 21 is mechanically linked through steering shaft 102 and steering gear 103 to front-left and front-right road wheels 5FL and 5FR. Steering actuator 104 produces an auxiliary steering torque applied to steering shaft 102. Instead of using a braking-force-actuator based yawing-motion control system, the modified vehicle dynamics control apparatus (or the modified integrated yawing motion control apparatus) 106 shown in FIG. 11 is comprised of a steering-actuator based yawing-motion control system (or an automatic steering torque application system). Modified vehicle dynamics control apparatus (modified integrated yawing motion control apparatus) 106 with steering actuator 104 is controlled in response to a control command signal from ECU 116. The construction of ECU 116 of FIG. 11 is similar to ECU 8 of FIG. 1, and thus detailed description of the construction of ECU 116 will be omitted. The processor of ECU 116 executes the second modified control routine shown in FIG. 12, which is somewhat modified from the control routine shown in FIG. 2. The second modified control routine shown in FIG. 12 is also executed as time-triggered interrupt routines to be triggered every predetermined sampling time intervals such as 10 milliseconds. The second modified control routine of FIG. 12 is similar to the control routine of FIG. 2, except that steps S11, S12 and S13 included in the routine shown in FIG. 2 are replaced with steps S10' and S13a included in the second modified routine shown in FIG. 12. Thus, the same step numbers used to designate steps in the routine shown in FIG. 2 will be applied to the corresponding step numbers used in the second modified control routine shown in FIG. 12, for the purpose of comparison of the two different interrupt routines. Steps S10' and S13a will be hereinafter described in detail with reference to the accompanying drawings, while detailed description of steps S1-S10 will be omitted because the above description thereon seems to be self-explanatory.

Briefly, according to the second modified routine of FIG. 12, input informational data from the engine/vehicle switches and sensors, and driving-torque controller 12 and camera controller 14 are read through step S1, host vehicle speed V is calculated through step S2, and then lane-deviation estimate XS is calculated from the expression XS=TtxVx(φ+TtxVx β)+X through step S3. At step S4, ECU 116 makes a check based on the input informational data to determine the presence or absence of the driver's intention for lane changing. At step S5, ECU 116 makes a decision based on the magnitude of lane-deviation estimate XS to signal a visual and/or audible warning for the increased host vehicle's lane-deviation tendency to the driver. When the absolute value |XS| of lane-deviation estimate XS becomes greater than or equal to predetermined lane-deviation criterion $X_C$, ECU 116 determines that there is an increased tendency for the host vehicle to deviate from the current driving lane (see step S6). At step S7, ECU 116 makes a decision based on lane-deviation decision flag $F_{LD}$ and the historical data of lane-deviation estimate XS to determine whether LDP control should be initiated. When ECU 116 determines that LDP control should be initiated, LDP desired yaw moment MsL, corresponding to the controlled variable for LDP control, is arithmetically calculated (see step S8). At step S9, VDC desired yaw moment MsV, corresponding to the controlled variable for VDC control, is arithmetically calculated based on yaw-rate deviation $\epsilon$ (=φr'−φ') between final desired yaw rate φr' and actual yaw rate φ', and sideslip angle γ. At step S10, final desired yaw moment Ms is determined based on LDP desired yaw moment MsL corresponding to the controlled variable for LDP control and VDC desired yaw moment MsV corresponding to the controlled variable for VDC control. Thereafter, step S10' occurs.

At step S10', the processor of ECU 116 calculates or determines a desired additional steering torque Tsstr, based on final desired yaw moment Ms, while taking into account the states of lane-deviation decision flag $F_{LD}$, VDC control indicative flag $F_{VDC}$, and LDP control inhibiting flag $F_{cancel}$. Concretely, when the condition defined by $F_{LD}$=0 or $F_{cancel}$=1 and $F_{VDC}$=0 is satisfied, in other words, ECU 116 determines that it is unnecessary to generate a yawing moment by way of VDC control and LDP control, desired additional steering torque Tsstr is set to "0". In contrast, when the condition defined by $F_{LD}$=0 or $F_{cancel}$=1 and $F_{VDC}$=0 is unsatisfied, desired additional steering torque Tsstr is calculated based on final desired yaw moment Ms by way of a so-called select-MIDDLE process shown in the following expression (26).

$$Tsstr = mid(-Tsstr_{-max}, -Kls \times Ms, +Tsstr_{-max}) \quad (26)$$

where $-Tsstr_{-max}$ denotes a negative limit of the desired additional steering torque, Tsstr-max denotes a positive limit of the desired additional steering torque, Kls denotes a predetermined conversion factor determined by specifications of the host vehicle. The previously-discussed select-MIDDLE process $Tsstr = mid(-Tsstr_{-max}, -Kls \times Ms, +Tsstr_{-max})$ means selection of the middle value of three values, that is, $-Tsstr_{-max}$, $-Kls \times Ms$, and $+Tsstr_{-max}$. As can be appreciated from the expression (26), desired additional steering torque Tsstr can be limited to a value existing between predetermined negative limit $-Tsstr_{-max}$ and predetermined positive limit $+Tsstr_{-max}$.

In the vehicle dynamics control apparatus capable of executing the second modified routine of FIG. 12, desired additional steering torque Tsstr is calculated or determined as a controlled variable for feedback control. In lieu thereof, desired additional steering torque Tsstr may be estimated or determined in such a manner as to achieve a desired lateral displacement (a desired lateral deviation) of the host vehicle or a desired sideslip angle, utilizing a vehicle reference model. After desired additional steering torque Tsstr is determined through step S10', step S13a occurs.

At step S13a, a command signal corresponding to desired additional steering torque Tsstr calculated or determined or estimated through step S10', is output from the input interface of ECU 116 to steering actuator 104. In this manner, one cycle of the time-triggered interrupt routine (the second modified routine of FIG. 12) terminates and the predetermined main program is returned.

According to the second modified routine of FIG. 12, when ECU 116 determines that it is necessary to produce the yaw moment controlled variable (final desired yaw moment Ms) by way of VDC control or LDP control, desired additional steering torque Tsstr corresponding to the final desired yaw moment Ms can be calculated or estimated. Then, steering actuator 104 operates in such a manner as to bring the actual additional steering torque (that is, the auxiliary steering torque) closer to desired additional steering torque Tsstr by way of steering control. As a result, a yawing moment corresponding to final desired yaw moment can be exerted on the host vehicle.

As set out above, the vehicle dynamics control apparatus executing the second modified control routine of FIG. 12 can provide the same operation and effects as the embodiment shown in FIG. 2. In the system shown in FIGS. 11 and 12, steering actuator 104 is used to exert a yawing moment on the host vehicle instead of using hydraulic modulator 7, and thus it is possible to generate a desired yawing moment without decelerating the host vehicle and without giving a feeling of uncomfortable vehicle deceleration to the driver.

As previously described, the second modification shown in FIGS. 11 and 12 is modified from the apparatus shown in FIGS. 1 and 2 by replacing the braking-force-actuator based yawing-motion control system with the steering-actuator based yawing-motion control system. In a similar manner, another modification may be created and modified from the apparatus shown in FIG. 8 by replacing the braking-force-actuator based yawing-motion control system with the steering-actuator based yawing-motion control system. In this case, preferably, braking forces of respective road wheels 5FL-5RR created by means of hydraulic modulator 7, which serves as a braking force generating means, may be adjusted depending on the controlled fluid pressure Pxgs, which is calculated based on desired deceleration rate Xgs (see step S8') needed to achieve vehicle deceleration control by way of LDP control.

In the modified vehicle dynamics control apparatus (or the modified integrated yawing motion control apparatus) 106 shown in FIGS. 10 and 11 equipped with the steering-actuator based yawing-motion control system including steering actuator 104, VDC control and LDP control are both achieved through steering actuator 104. In lieu thereof, VDC control may be attained by only the braking-force-actuator based yawing-motion control system including hydraulic modulator 7, whereas LDP control may be attained by only the steering-actuator based yawing-motion control system including steering actuator 104. Alternatively, VDC control may be attained by only the steering-actuator based yawing-motion control system including steering actuator 104, whereas LDP control may be attained by only the braking-force-actuator based yawing-motion control system including hydraulic modulator 7. That is, a first system of the steering-actuator based yawing-motion control system and the braking-force-actuator based yawing-motion control system is associated with VDC control, whereas the second system is associated with LDP control. In this case, when a higher priority has to be put on VDC control rather than LDP control, a controlled variable for the first system has to be adjusted in a manner so as to produce final desired yaw moment Ms. Conversely when a higher priority has to be put on LDP control rather than VDC control, a controlled variable for the second system has to be adjusted in a manner so as to produce final desired yaw moment Ms. Furthermore, as described previously in reference to the expression (14) and the predetermined actual yaw rate φ' versus yaw-moment controlled variable upper limit Mslim characteristic map of FIG. 5, final desired yaw moment Ms may be determined, taking into account summed desired yaw moment Ms$_{sum}$ (=MsV+MsL) of VDC desired yaw moment MsV and LDP desired yaw moment MsL and yaw-moment controlled variable upper limit Mslim determined depending on the host vehicle's turning degree. In this case, it is preferable that compensation for both of VDC desired yaw moment MsV and LDP desired yaw moment MsL is made without changing a ratio of two controlled variables MsV and MsL such that the summed desired yaw moment does not exceed the upper limit Mslim, so as to produce a compensated VDC-control controlled variable MsV' and a compensated LDP-control controlled variable MsL'. Additionally, when a higher priority has to be put on VDC control rather than LDP control, a controlled variable for the first system has to be adjusted based on compensated VDC-control controlled variable MsV'. Conversely when a higher priority has to be put on LDP control rather than VDC control, a controlled variable for the second system has to be adjusted based on compensated LDP-control controlled variable MsL'. Moreover, as described previously in reference to the expression (15) and the preprogrammed sideslip angle γ versus weighting factor Ka characteristic map shown in FIG. 6, final desired yaw moment Ms may be determined, taking into account the weighting (i.e., Ka) for VDC control and the weighting (1-Ka) for LDP control. The weighted VDC desired yaw moment MsV"(=Ka×MsV) and the weighted LDP desired yaw moment MsL"(=(1-Ka)×MsL) are determined, taking into account the weighting factor Ka retrieved. Thereafter, when a higher priority has to be put on VDC control rather than LDP control, a controlled variable for the first system has to be adjusted based on weighted VDC desired yaw moment MsV"(=Ka×MsV). Conversely when a higher priority has to be put on LDP control rather than VDC control, a controlled variable for the second system has to be adjusted based on weighted LDP desired yaw moment MsL" (=(-1Ka)×MsL).

In the vehicle dynamics control apparatus (the integrated yawing-motion control apparatus 106) executing the second modified control routine of FIG. 12, steering actuator 104 of automatic steering torque application system 106 serves as a steering torque application means. The process of step S10 of FIG. 12 serves as a cooperative-control controlled variable calculation means. The process of step S10' serves as a steering-torque desired value adjusting means or a desired steering torque value adjusting means.

In the shown embodiment, predetermined lane-deviation criterion $X_C$ is fixed to a predetermined constant value. Actually, a lane width L of each of driving lanes is not fixed constant. Thus, predetermined lane-deviation criterion $X_C$ may be a variable, which is determined depending on lane width L of each of driving lanes. As shown in FIG. 11, the lane width L itself can be obtained by image-processing the image data from CCD camera 13 or by extracting input information regarding the lane width of the current driving lane as map data, utilizing navigation system 114. In this case, predetermined lane-deviation criterion $X_C$, which is a variable, can be calculated from the following expression (27).

$$X_C = \min\{(L/2-Lc/2), 0.8\} \quad (27)$$

where Lc denotes a host vehicle's width and L denotes a lane width. As can be appreciated from the above expression (27), predetermined lane-deviation criterion $X_C$ is obtained as a lower one of the value (L/2-Lc/2) and 0.8 by way of a so-called select-LOW process.

In lieu thereof, in case of an automated highway equipped with an infrastructure, a distance data (L/2-XS), which is obtained and received by way of mutual communication between the host vehicle and the on-road network (or the on-road sensor) contained in the infrastructure, may be used as input information regarding an estimate of predetermined lane-deviation criterion $X_C$.

As will be appreciated from the above, the vehicle dynamics control apparatus of the embodiment includes a driving condition detection section (or driving condition detection means) that detects or estimates or determines whether the host vehicle tends to deviate from the driving lane toward the inside lane or toward the outside lane during turns. Also provided is a cooperative control section (or cooperative control means) that executes, based on the host vehicle's driving condition detected, cooperative control between lane deviation prevention control performed by the LDP control system and vehicle dynamics stability control (vehicle driving stability control) performed by the VDC control system. Therefore, it is possible to effectively perform the cooperative control, taking into account the host vehicle's driving condition.

Additionally, in case that the direction of yawing motion created by VDC control (that is, the sign of VDC desired yaw moment MsV) is opposite to the direction of yawing motion created by LDP control (that is, the sign of LDP desired yaw moment MsL), a higher priority is put on VDC control rather than LDP control, and whereby it is possible to more certainly stabilize the host vehicle's dynamic behavior, which is more important than the host vehicle's lane deviation prevention.

In the vehicle dynamics control apparatus of the embodiment employing the braking-force-actuator based yawing-motion control system, hydraulic modulator 7 (braking force generating means) is provided to generate a braking force regardless of the driver's brake-pedal depression. When the host vehicle tends to deviate from the driving lane toward the adjacent outside lane during a turn under a condition where a higher priority is put on VDC control rather than LDP control, the cooperative control means achieves the yawing motion control by controlling the braking force applied to each road wheel by means of the braking force generating means (hydraulic modulator 7). It is possible to provide the additional effect, namely lane deviation prevention, while putting a higher priority on the vehicle driving stability control achieved by the VDC control system.

Furthermore, the cooperative control means also employs an intentional level detection section (or intentional level detection means) that detects or determines whether a level of the driver's intention for lane deviation (or lane changing) is high (Fhi=1) or low (Fhi=0). The cooperative control means executes, based on the driver's intentional level for lane deviation, the cooperative control between LDP control and VDC control. Thus, it is possible to execute the cooperative control depending on the presence or absence of the driver's intention for lane deviation (or lane changing).

Moreover, when it is decided that the driver's intentional level for lane deviation is high (Fhi=1) under a condition where the direction of yawing motion created by the VDC control means (that is, the sign of VDC desired yaw moment MsV) is opposite to the direction of yawing motion created by the LDP control means (that is, the sign of LDP desired yaw moment MsL) and additionally the driving condition detection means detects that the host vehicle tends to deviate from the driving lane toward the adjacent outside lane during a turn, the cooperative control means puts a higher priority on VDC control rather than LDP control. Conversely when it is decided that the driver's intentional level for lane deviation is low (Fhi=0) under a condition where the direction of yawing motion created by the VDC control means (that is, the sign of VDC desired yaw moment MsV) is opposite to the direction of yawing motion created by the LDP control means (that is, the sign of LDP desired yaw moment MsL) and additionally the driving condition detection means detects that the host vehicle tends to deviate from the driving lane toward the adjacent outside lane during a turn, the cooperative control means puts a higher priority on LDP control rather than VDC control. Thus, when it is decided that the host vehicle tends to deviate from the driving lane with the driver's intention for lane deviation (or lane changing), by virtue of VDC control to which a higher priority is given, it is possible to enhance vehicle driveability or maneuverability, thus ensuring easy change of vehicle heading or easy turning. On the contrary, when it is decided that the host vehicle tends to deviate from the driving lane with no driver's intention for lane deviation (or lane changing), by virtue of LDP control to which a higher priority is given, it is possible to prevent undesired lane deviation. In this manner, it is possible to achieve the cooperative control, taking into account the presence or absence of the driver's intention for lane deviation or lane changing.

Also provided is a manipulated variable detector (or manipulated variable detection means) that detects a driver's manipulated variable, such as steering torque Tstr, accelerator opening Acc, and/or master-cylinder pressure Pm. A comparison result between the driver's manipulated variable (Tstr, Acc, and/or Pm) detected by the manipulated variable detection means and its threshold value, or a comparison result between a time rate of change in the manipulated variable (Tstr, Acc, and/or Pm) and its threshold value is used to determine whether the level of the driver's intention for lane deviation (or lane changing) is high (Fhi=1) or low (Fhi=0). Thus, it is possible to easily certainly detect or determine the driver's intentional level for lane deviation (or lane changing).

When an image-processing device such as CCD camera 13 is further incorporated in the vehicle dynamics control apparatus of the embodiment in order to detect the level of the driver's intention for lane deviation based on the image data from the image-processing device, it is possible to more quickly continuously detect the driver's intentional level for lane deviation or lane changing, thus realizing a more optimal, high-precision cooperative control based on the driver's intentional level detected more exactly continuously by means of the image-processing device such as a CCD camera.

Additionally, in case that the direction of yawing motion created by VDC control (that is, the sign of VDC desired yaw moment MsV) is identical to the direction of yawing motion created by LDP control (that is, the sign of LDP desired yaw moment MsL), a higher one of VDC desired yaw moment MsV corresponding to the controlled variable for VDC control and LDP desired yaw moment MsL corresponding to the controlled variable for LDP control is selected as final desired yaw moment Ms by way of the select-HIGH process Ms=max (|MsV|, |MsL|), thus effectively preventing over-control, thus permitting a proper magnitude of yaw moment to be actively exerted on the host vehicle, while preventing excessive application of yawing moment to the host vehicle.

In case that final desired yaw moment Ms is determined, taking into account summed desired yaw moment $MS_{sum}$ (=MsV+MsL) of VDC desired yaw moment MsV and LDP desired yaw moment MsL and yaw-moment controlled variable upper limit Mslim determined depending on the host vehicle's turning degree, under a condition where the direction of yawing motion created by VDC control (that is, the sign of VDC desired yaw moment MsV) is identical to the direction of yawing motion created by LDP control (that is, the sign of LDP desired yaw moment MsL), the cooperative control means is made so that the summed desired yaw moment $MS_{sum}$ (=MsV+MsL) does not exceed the upper limit Mslim. Thus, it is possible to avoid over-control, that is, an excessive controlled variable for yaw moment control, while insuring the effects obtained by LDP control and VDC control. In this case, yaw-moment controlled variable upper limit Mslim is variably determined depending on a host vehicle's turning degree, which is detected by a turning degree detector or a turning degree detection means such as yaw rate sensor 16.

In case that final desired yaw moment Ms is determined, taking into account weighting for both of LDP desired yaw moment MsL corresponding to the controlled variable for LDP control and VDC desired yaw moment MsV corresponding to the controlled variable for VDC control, under a condition where the direction of yawing motion created by VDC control (that is, the sign of VDC desired yaw moment MsV) is identical to the direction of yawing motion created by LDP control (that is, the sign of LDP desired yaw moment MsL), it is possible to optimally balance the effects obtained by LDP control and VDC control by virtue of the weighted VDC desired yaw moment Ka×MsV and the weighted LDP desired yaw moment (1−Ka)×MsL, and effectively prevent over-control.

The LDP control section (or LDP control means) also includes a host-vehicle driving data detection section (or host-vehicle driving data detection means) that detects at least the host vehicle speed V, host vehicle's yaw angle φ, host vehicle's lateral deviation X from the central axis of the host vehicle's driving lane, and curvature β of the host vehicle's driving lane. A lane-deviation estimate XS, in other words, an estimate of a future lateral deviation, is estimated or determined based on driving data detected by the host-vehicle driving data detection means. A direction of lane deviation and a possibility (or a tendency) of lane deviation are both estimated or determined based on lane-deviation estimate XS. A comparison result between lane-deviation estimate XS and its predetermined lane-deviation criterion $X_C$ is used to determine whether there is an increased tendency of lane deviation, thus ensuring a more exact decision for the increased lane-deviation tendency. Also, the LDP control means estimates or determines lane-deviation estimate XS based on driving data (V, φ, X, β) detected by the host-vehicle driving data detection means. An LDP desired yaw moment MsL is calculated based on the deviation (XS–$X_C$) between lane-deviation estimate XS and predetermined lane-deviation criterion $X_C$, thus suitably avoiding the host vehicle from deviating from the driving lane.

When it is decided that there is a possibility of the host vehicle's lane deviation, the LDP control means calculates a braking/driving force controlled variable for each of left and right road wheels based on the driving data from the host-vehicle driving data detection means, so that a yawing moment is generated in a direction in which the lane deviation is avoided. When it is decided that the host vehicle's driveability or maneuverability is lowered, the VDC control means calculates a braking/driving force controlled variable for each of left and right road wheels, so that a yawing moment is generated in a direction of vehicle heading. In contrast, when it is decided that the host vehicle's driving stability is lowered, the VDC control means calculates a braking/driving force controlled variable for each of the left and right road wheels, so that a yawing moment is generated in a direction in which the driving stability is enhanced. On the other hand, the cooperative control means includes a cooperative-control controlled variable calculation section (or cooperative-control controlled variable calculation means) that calculates a cooperative-control braking/driving force controlled variable by making the cooperative control between the braking/driving force controlled variable calculated by the LDP control means and the braking/driving force controlled variable calculated by the VDC control means. The cooperative control means also includes a braking/driving force distribution adjusting section (braking/driving force distribution adjusting means) that adjusts the braking/driving force distribution between the left and right road wheels, depending on the cooperative-control braking/driving force controlled variable calculated by the cooperative-control controlled variable calculation means. Thus, it is possible to optimally balance two control actions achieved by the LDP control system and the VDC control system.

The cooperative control means is constructed in a manner so as to be able to arbitrarily control the braking force of each of the left and right road wheels regardless of a driver's braking action, thus ensuring accurate braking-force adjustment of each road wheel.

In the vehicle dynamics control apparatus of the embodiment employing the steering-actuator based yawing-motion control system, steering actuator 104 of automatic steering torque application system 106 (a steering torque application section (a steering torque application means) is provided to automatically generate an additional steering torque (an auxiliary steering torque). When it is decided that there is a possibility of the host vehicle's lane deviation, the LDP control means calculates a steering torque controlled variable for the steering system based on the driving data from the host-vehicle driving data detection means, so that a yawing moment is generated in a direction in which the lane deviation is avoided. When it is decided that the host vehicle's driveability or maneuverability is lowered, the VDC control means calculates a steering torque controlled variable, so that a yawing moment is generated in a direction of vehicle heading. In contrast, when it is decided that the host vehicle's driving stability is lowered, the VDC control means calculates a steering torque controlled variable, so that a yawing moment is generated in a direction in which the driving stability is enhanced. On the other hand, the cooperative control means includes a cooperative-control controlled variable calculation section (or cooperative-control controlled variable calculation means) that calculates a cooperative-control steering torque controlled variable by making a cooperative control between the steering torque controlled variable calculated by the LDP control means and the steering torque controlled variable calculated by the VDC control means. The cooperative control means also includes a steering-torque desired value adjusting section (steering-torque desired value adjusting means) that adjusts a steering-torque desired value for the steering torque application means, depending on the cooperative-control steering torque controlled variable calculated by the cooperative-control controlled variable calculation means. Thus, it is possible to optimally balance two control actions achieved by the LDP control system and the VDC control system, without giving a feeling of uncomfortable vehicle deceleration to the driver.

In the vehicle dynamics control apparatus of the embodiment employing the steering-actuator based yawing-motion control system, steering actuator 104 of automatic steering torque application system 106 (a steering torque application section (a steering torque application means) is provided to automatically generate an additional steering torque (an auxiliary steering torque). When it is decided that there is a possibility of the host vehicle's lane deviation, the LDP control means calculates a yaw moment controlled variable for the steering system based on the driving data from the host-vehicle driving data detection means, so that a yawing moment is generated in a direction in which the lane deviation is avoided. When it is decided that the host vehicle's driveability or maneuverability is lowered, the VDC control means calculates a yaw moment controlled variable, so that a yawing moment is generated in a direction of vehicle heading. In contrast, when it is decided that the host vehicle's driving stability is lowered, the VDC control means calculates a yaw moment controlled variable, so that a yawing moment is generated in a direction in which the driving stability is enhanced. On the other hand, the cooperative control means includes a cooperative-control controlled variable calculation section (or cooperative-control controlled variable calculation means) that calculates a LDP-control cooperative-control yaw moment controlled variable and a VDC-control cooperative-control yaw moment controlled variable by making a cooperative control between the yaw moment controlled variable calculated by the LDP control means and the yaw moment controlled variable calculated by the VDC control means. The cooperative control means also includes a controlled variable adjusting section (controlled variable adjusting means) that adjusts the steering-torque desired value for the steering torque application means depending on a first one of the LDP-control cooperative-control yaw moment controlled variable and the VDC-control cooperative-control yaw moment controlled variable, and additionally adjusts the braking/driving force distribution between left and right road wheels depending on the second cooperative-control yaw moment controlled variable. Thus, it is possible to more optimally balance two control actions achieved by the LDP control system and the VDC control system. Additionally, by virtue of cooperative control between automatic additional steering torque application achieved via steering actuator 104 and automatic left-and-right wheel braking/driving force adjustment achieved via hydraulic modulator 7, it is possible to generate a controlled yawing moment, while more optimally balancing two control actions achieved by the LDP control system and the VDC control system, thus effectively suppressing the driver from experiencing an uncomfortable vehicle deceleration feel.

The entire contents of Japanese Patent Application No. 2003-032459 (filed Feb. 10, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A method of balancing a lane deviation prevention control system configured to generate a yaw moment in a direction in which lane deviation is avoided when a host vehicle tends to deviate from a driving lane, and a vehicle dynamics control system configured to generate a yaw moment in a direction in which a driving stability is enhanced when the driving stability of the host vehicle lowers, the method comprising:
    making a cooperative control between lane deviation prevention control achieved by the lane deviation prevention control system and vehicle dynamics stability control achieved by the vehicle dynamics control system,
    wherein the cooperative control is made to put a higher priority on a higher one of a controlled variable for the lane deviation prevention control system and a controlled variable for the vehicle dynamics control system, when a direction of yawing motion created by the lane deviation prevention control achieved by the lane deviation prevention control system is identical to a direction of yawing motion created by the vehicle dynamics stability control achieved by the vehicle dynamics control system.

2. The method as claimed in claim 1, further comprising:
    detecting a driving condition of the host vehicle; and
    executing the cooperative control based on the driving condition.

3. The method as claimed in claim 1, wherein:
    the cooperative control is made to put a higher priority on the vehicle dynamics stability control rather than the lane deviation prevention control, when a direction of yawing motion created by the lane deviation prevention control achieved by the lane deviation prevention control system is opposite to a direction of yawing motion created by the vehicle dynamics stability control achieved by the vehicle dynamics control system.

4. The method as claimed in claim 3, wherein:
    making the cooperative control comprises:
        arbitrarily controlling a braking force of each of left and right road wheels regardless of a driver's brake-pedal depression.

5. The method as claimed in claim 1, further comprising:
    detecting a level of a driver's intention for lane-changing; and
    executing the cooperative control based on the level of the driver's intention for lane-changing.

6. The method as claimed in claim 5, wherein:
    the cooperative control is made to put a higher priority on the vehicle dynamics stability control rather than the lane deviation prevention control, when it is decided that the level of the driver's intention for lane-changing is high under a condition where a direction of yawing motion created by the lane deviation prevention control system is opposite to a direction of yawing motion created by the vehicle dynamics control system and that the host vehicle tends to deviate from the driving lane toward the outside lane during a turn, and
    wherein the cooperative control is made to put a higher priority on the lane deviation prevention control rather than the vehicle dynamics stability control, conversely when it is decided that the level of the driver's intention for lane-changing is low under a condition where the direction of yawing motion created by the lane deviation prevention control system is opposite to the direction of yawing motion created by the vehicle dynamics control system and that the host vehicle tends to deviate from the driving lane toward the outside lane during a turn.

7. The method as claimed in claim 5, further comprising;
    detecting a driver's manipulated variable; and
    detecting the level of the driver's intention for lane-changing, based on the manipulated variable.

8. The method as claimed in claim 5, further comprising:
    generating an image data regarding the level of the driver's intention for lane-changing; and
    detecting the level of the driver's intention for lane-changing, based on the image data.

9. A method of balancing a lane deviation prevention control system configured to generate a yaw moment in a direction in which lane deviation is avoided when a host vehicle tends to deviate from a driving lane, and a vehicle dynamics control system configured to generate a yaw moment in a direction in which a driving stability is enhanced when the driving stability of the host vehicle lowers, the method comprising:
    making a cooperative control between lane deviation prevention control achieved by the lane deviation prevention control system and vehicle dynamics stability control achieved by the vehicle dynamics control system,
    wherein the cooperative control is executed such that a summed yaw moment controlled variable of a controlled variable for the lane deviation prevention control system and a controlled variable for the vehicle dynamics control system does not exceed a yaw-moment controlled variable upper limit, when a direction of yawing motion created by the lane deviation prevention control achieved by the lane deviation prevention control system is identical to a direction of yawing motion created by the vehicle dynamics stability control achieved by the vehicle dynamics control system.

10. The method as claimed in claim 8, further comprising:
    detecting a turning degree of the host vehicle; and
    variably determining the yaw-moment controlled variable upper limit depending on the turning degree.

11. A method of balancing a lane deviation prevention control system configured to generate a yaw moment in a direction in which lane deviation is avoided when a host vehicle tends to deviate from a driving lane, and a vehicle dynamics control system configured to generate a yaw moment in a direction in which a driving stability is enhanced when the driving stability of the host vehicle lowers, the method comprising:

making a cooperative control between lane deviation prevention control achieved by the lane deviation prevention control system and vehicle dynamics stability control achieved by the vehicle dynamics control system; and executing a weighting process for both of a controlled variable for the lane deviation prevention control system and a controlled variable for the vehicle dynamics control system, when a direction of yawing motion created by the lane deviation prevention control achieved by the lane deviation prevention control system is identical to a direction of yawing motion created by the vehicle dynamics stability control achieved by the vehicle dynamics control system.

12. The method as claimed in claim 11, further comprising:

detecting at least a host vehicle speed, a host vehicle's yaw angle, a host vehicle's lateral deviation from a central axis of the host vehicle's driving lane, and a curvature of the host vehicle's driving lane;

estimating a lane-deviation estimate corresponding to an estimate of a future lateral deviation of the host vehicle, based on a driving data;

estimating a direction of lane deviation and a possibility of lane deviation based on the lane-deviation estimate; and determining that the host vehicle tends to deviate from the driving lane, when the lane-deviation estimate becomes greater than or equal to a predetermined lane-deviation criterion.

13. The method as claimed in claim 12, wherein:

the lane-deviation estimate is estimated based on at least the host vehicle speed, the host vehicle's yaw angle, the host vehicle's lateral deviation from the central axis of the driving lane, and the curvature of the host vehicle's driving lane, and wherein a controlled variable for the lane deviation prevention control is calculated based on a deviation between the lane-deviation estimate and the predetermined lane-deviation criterion.

14. The method as claimed in claim 12, wherein:

a braking/driving force controlled variable for each of left and right road wheels is calculated based on the driving data when it is decided that there is a possibility of host vehicle's lane deviation, so that a yaw moment is generated in a direction in which the lane deviation is avoided, and wherein a braking/driving force controlled variable for each of the left and right road wheels is calculated when it is decided that a host vehicle's maneuverability is lowered, so that a yaw moment is generated in a direction of vehicle heading, and conversely when it is decided that a host vehicle's driving stability is lowered, a braking/driving force controlled variable for each of the left and right road wheels is calculated, so that a yaw moment is generated in a direction in which the driving stability is enhanced, and wherein making the cooperative control comprises:
calculating a cooperative-control braking/driving force controlled variable by providing cooperative control between the braking/driving force controlled variable calculated by the lane deviation prevention control system and the braking/driving force controlled variable calculated by the vehicle dynamics control system; and adjusting a braking/driving force distribution between the left and right road wheels, based on the cooperative-control braking/driving force controlled variable.

15. The method as claimed in claim 14, wherein:
making the cooperative control comprises:
arbitrarily controlling the braking force of each of the left and right road wheels regardless of a driver's braking action.

16. The method as claimed in claim 12, further comprising:
automatically applying a steering torque to a steering system, and wherein a steering torque controlled variable for the steering system is calculated based on the driving data when it is decided that there is a possibility of host vehicle's lane deviation, so that a yaw moment is generated in a direction in which the lane deviation is avoided, and wherein a steering torque controlled variable is calculated when it is decided that a host vehicle's maneuverability is lowered, so that a yaw moment is generated in a direction of vehicle heading, and conversely when it is decided that a host vehicle's driving stability is lowered, a steering torque controlled variable is calculated, so that a yaw moment is generated in a direction in which the driving stability is enhanced, and wherein making the cooperative control comprises:
calculating a cooperative-control steering torque controlled variable by providing cooperative control between the steering torque controlled variable calculated by the lane deviation prevention control system and the steering torque controlled variable calculated by the vehicle dynamics control system; and adjusting a steering torque desired value, based on the cooperative-control steering torque controlled variable.

17. The method as claimed in claim 12, further comprising:
automatically applying a steering torque to a steering system, and wherein a yaw moment controlled variable for the steering system is calculated based on the driving data when it is decided that there is a possibility of host vehicle's lane deviation, so that a yaw moment is generated in a direction in which the lane deviation is avoided, and wherein a yaw moment controlled variable is calculated when it is decided that a host vehicle's maneuverability is lowered, so that a yaw moment is generated in a direction of vehicle heading, and conversely when it is decided that a host vehicle's driving stability is lowered, a yaw moment controlled variable is calculated, so that a yaw moment is generated in a direction in which the driving stability is enhanced, and wherein making the cooperative control comprises:
calculating a lane-deviation-prevention-control cooperative-control yaw moment controlled variable and a vehicle-dynamics-stability-control cooperative-control yaw moment controlled variable by providing cooperative control between the yaw moment controlled variable calculated by the lane deviation prevention control system and the yaw moment controlled variable calculated by the vehicle dynamics control system;

adjusting a steering torque desired value, based on a first one of the lane-deviation-prevention-control cooperative-control yaw moment controlled variable and the vehicle-dynamics-stability-control cooperative-control yaw moment controlled variable; and additionally adjusting a braking/driving force distribution between left and right road wheels, based on the second cooperative-control yaw moment controlled variable.

* * * * *